(12) United States Patent
Ahn et al.

(10) Patent No.: US 11,341,355 B2
(45) Date of Patent: May 24, 2022

(54) ROBOT AND METHOD OF CONTROLLING THE SAME

(71) Applicant: LG ELECTRONICS INC., Seoul (KR)

(72) Inventors: Yeongnam Ahn, Seoul (KR); Kaeun Lee, Seoul (KR); Jiyun Jung, Seoul (KR); Taegil Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 119 days.

(21) Appl. No.: 16/723,561

(22) Filed: Dec. 20, 2019

(65) Prior Publication Data

US 2020/0320297 A1 Oct. 8, 2020

Related U.S. Application Data

(60) Provisional application No. 62/783,207, filed on Dec. 21, 2018.

(30) Foreign Application Priority Data

Jan. 7, 2019 (WO) ................ PCT/KR2019/000222

(51) Int. Cl.
| | | |
|---|---|---|
| G06F 3/0482 | (2013.01) | |
| G06K 9/00 | (2022.01) | |
| G05D 1/00 | (2006.01) | |
| G06F 3/04883 | (2022.01) | |
| G06F 3/16 | (2006.01) | |
| G06T 11/00 | (2006.01) | |

(52) U.S. Cl.
CPC ....... G06K 9/00671 (2013.01); G05D 1/0094 (2013.01); G06F 3/0482 (2013.01); G06F 3/04883 (2013.01); G06F 3/167 (2013.01); G06K 9/00362 (2013.01); G06T 11/00 (2013.01); *G06T 2200/24* (2013.01)

(58) Field of Classification Search
None
See application file for complete search history.

(56) References Cited

U.S. PATENT DOCUMENTS

2012/0316676 A1* 12/2012 Fouillade ............... B25J 9/1697
700/246
2015/0154453 A1 6/2015 Wilf
(Continued)

FOREIGN PATENT DOCUMENTS

| KR | 10-2012-0121036 A | 11/2012 |
|---|---|---|
| KR | 10-2014-0018599 A | 2/2014 |

(Continued)

*Primary Examiner* — William C Trapanese
(74) *Attorney, Agent, or Firm* — Birch, Stewart, Kolasch & Birch, LLP

(57) ABSTRACT

Disclosed is a method of controlling a robot, the method including receiving user input of a request for fitting service, moving the robot to a position at which a distance from the user satisfies a predetermined reference distance or more, and a predetermined range or more of the body of the user is scannable, scanning the predetermined range or more of the body of the user through the camera at the moved position, and providing the fitting service by creating a virtual avatar character of the user based on a result of scanning.

20 Claims, 27 Drawing Sheets

| total distance | part | Reference body size |
|---|---|---|
| 1m | head | 12 cm |
| | shoulder | 30 cm |
| | waist | 18 cm |
| | height | 150 cm |
| 1.1m | head | 10 cm |
| | shoulder | 25 cm |
| | waist | 16 cm |
| | height | 140 cm |
| 1.2m | head | 8 cm |
| | shoulder | 23 cm |
| | waist | 14 cm |
| | height | 130 cm |
| 1.3m | head | 6 cm |
| | shoulder | 21 cm |
| | waist | 12 cm |
| | height | 120 cm |

(56) References Cited

U.S. PATENT DOCUMENTS

| | | | | |
|---|---|---|---|---|
| 2016/0093085 A1* | 3/2016 | Ray | ............... | A61B 5/6888 |
| | | | | 345/419 |
| 2017/0156430 A1 | 6/2017 | Karavaev | | |
| 2017/0353711 A1* | 12/2017 | Wayenberg | ......... | H04N 13/221 |
| 2021/0142379 A1* | 5/2021 | Bleicher | ............ | G01B 11/24 |

FOREIGN PATENT DOCUMENTS

| | | | |
|---|---|---|---|
| KR | 10-2014-0046289 A | 4/2014 | |
| KR | 10-2015-0079585 A | 7/2015 | |

\* cited by examiner

FIG.12

| total distance | part | Reference body size |
|---|---|---|
| 1m | head | 12 cm |
| | shoulder | 30 cm |
| | waist | 18 cm |
| | height | 150 cm |
| 1.1m | head | 10 cm |
| | shoulder | 25 cm |
| | waist | 16 cm |
| | height | 140 cm |
| 1.2m | head | 8 cm |
| | shoulder | 23 cm |
| | waist | 14 cm |
| | height | 130 cm |
| 1.3m | head | 6 cm |
| | shoulder | 21 cm |
| | waist | 12 cm |
| | height | 120 cm |

ROBOT AND METHOD OF CONTROLLING THE SAME

CROSS-REFERENCE TO RELATED APPLICATION

This application claims priority under 35 U.S.C. § 119 to and the benefit of U.S. 62/783,207, filed on Dec. 21, 2018, and PCT/KR2019/000222, filed on Jan. 7, 2019, the disclosures of which are hereby incorporated by reference in their entireties.

BACKGROUND

1. Technical Field

The present invention relates to a robot and a method of controlling the same, and more particularly to a robot capable of providing a virtual fitting service and a method of controlling the same.

2. Related Art

Robots have been developed for industrial purposes and have taken charge of a portion of factory automation. In recent years, the number of fields in which robots are utilized has increased. As a result, a medical robot and an aerospace robot have been developed. In addition, a home robot usable at home is being manufactured. Among such robots, a robot capable of autonomously traveling is called a mobile robot.

With an increase in the use of robots, the demand for robots capable of providing various kinds of information, entertainment, and services in addition to repeated performance of simple functions has increased.

As a result, a communication robot disposed in homes, stores, and public facilities so as to communicate with people is being developed.

In addition, various kinds of services using a mobile robot that is capable of autonomously traveling have been proposed. For example, a prior document (Korean Patent Application Publication No. 10-2008-0090150, Publication Date: Oct. 8, 2008) proposes a service robot capable of providing a service based on the current position while moving in a service area, a service system using the service robot, and a method of controlling the service system using the service robot.

However, the kinds of services that are provided using a mobile robot are limited. Therefore, there is a necessity for developing various services using hardware, software, and mobility of a robot.

3. Technical Problem

It is an object of the present invention to provide a robot capable of providing a virtual fitting service and a method of controlling the same.

It is another object of the present invention to provide a robot capable of accurately identifying body information of a user and creating an avatar while minimizing the movement of the user, and a method of controlling the same.

It is a further object of the present invention to provide a robot capable of providing a virtual fitting service including various kinds of information using an avatar having body information of a user reflected therein, and a method of controlling the same.

SUMMARY

1. Technical Solution

In accordance with an aspect of the present invention, the above and other objects can be accomplished by the provision of a robot, and a method of controlling the same, wherein the robot conveniently provides a virtual fitting service while moving.

In accordance with another aspect of the present invention, the above and other objects can be accomplished by the provision of a method of controlling a robot, the method including receiving user input comprising a request for fitting service; moving to a position at which a distance from the user satisfies a predetermined reference distance or more, and predetermined range or more of the body of the user can be scanned; scanning the predetermined range or more of the body of the user through the camera at the moved position; and providing the fitting service by creating a virtual avatar character of the user based on a result of scanning.

The robot includes a driving module comprising at least one wheel, and moving a main body, and the scanning step comprises; calculating a distance that the robot moves by measuring the rotational speed of the wheel of the driving module; reading a reference body size value in proportion to the calculated distance; and determining body shape information of the user based on a difference between the reference body size value and the actual body size value of the user of the result of scanning.

The scanning step further comprises photographing the user in a first direction; photographing in a second direction different from the first direction by rotating around the user; and determining body information of the user based on the acquired images from the first direction and the second direction.

The moving step comprises measuring a distance between the user and the robot; controlling the driving module to be spaced apart by the reference distance when the distance between the user and the robot is less than the reference distance; confirming whether a predetermined range or more of the body of the user is scannable through the camera at the reference distance; and controlling the driving module such that the distance between the user and the robot is greater than the reference distance when scanned below a predetermined range of the body of the user.

Providing the fitting service comprises displaying a user interface screen including a synthesized image obtained by synthesizing the virtual avatar character and the image of the clothes selected by the user on a display.

The scanning step further comprises displaying a camera view screen of the camera on the display; and displaying at least one body contour information based on a user image on the camera view screen.

The scanning step further comprises displaying a camera view screen of the camera on the display; displaying at least one body contour information based on user image on the camera view screen; and changing and displaying the body contour information according to the rotation.

The method further comprises outputting a message guiding a user action for scanning.

The method further comprises displaying text and a graphical image indicating scanning progress during the scanning.

The method further comprises upon completing the scanning, displaying a message informing of completion of the scanning and information about a recommended size based on the body information of the user.

The method further comprises receiving at least one of new product information, popular product information, or event information from a server; and recommending a predetermined product based on the received information.

The method further comprises identifying the user; receiving information about previous purchase particulars or fitting particulars of the user from a server; and recommending a predetermined product based on the received information about previous purchase particulars or fitting particulars of the user.

The user interface screen further comprises a product option item capable of changing an option of the selected clothes, and in a case in which a size corresponding to a recommended size based on the body information of the user is selected in the product option item, the user interface screen further displays information about the recommended size.

Meanwhile, in accordance with a further aspect of the present invention, there is provided a robot including a driving module for moving a main body; one or more cameras for scanning a body of user and generating a result of scanning; an input for receiving a request for fitting service from the user; a controller configured to move to a position capable of scanning a predetermined range or more of the body of the user according to request for fitting service from the user, and generate a virtual avatar character of the user based on the result of scanning from the camera; and a display for displaying the virtual avatar character of the user and providing the fitting service.

The input further comprises a microphone configured to receive the request for fitting service from the user as a voice input.

The display unit is configured to receive the request for fitting service from the user as a touch input.

The driving module includes at least one wheel, and the controller calculates a distance that the robot moves by measuring the rotational speed of the wheel of the driving module, reads a reference body size value in proportion to the calculated distance, and determines body shape information of the user based on a difference between the reference body size value and the actual body size value of the user of the result of scanning.

The controller acquires images by photographing the user in a first direction and in a second direction different from the first direction by rotating around the user, and determines body information of the user based on the acquired images from the first direction and the second direction.

The controller measures a distance between the user and the robot, controls the driving module to be spaced apart by the reference distance when the distance between the user and the robot is less than the reference distance, confirms whether a predetermined range or more of the body of the user is scannable through the camera at the reference distance, and controls the driving module such that the distance between the user and the robot is greater than the reference distance when scanned below a predetermined range of the body of the user.

The controller controls the display to display a user interface screen including a synthesized image obtained by synthesizing the virtual avatar character and the image of the clothes selected by the user.

2. Advantageous Effects

According to at least one of the embodiments of the present invention, it is possible to provide a virtual fitting service, thereby improving user convenience.

In addition, according to at least one of the embodiments of the present invention, it is possible to accurately identify body information of a user and to create an avatar while minimizing the movement of the user.

In addition, according to at least one of the embodiments of the present invention, it is possible to provide a virtual fitting service including various kinds of information using an avatar having body information of a user reflected therein.

In addition, according to at least one of the embodiments of the present invention, it is possible to provide a recommendation service based on a fitting history and a purchase history of a user.

Various other effects of the present invention will be disclosed in the following detailed description of the invention.

BRIEF DESCRIPTION OF THE DRAWINGS

FIG. 12 is chart illustrating a reference body size for each body part for various total distances.

DETAILED DESCRIPTION

Reference will now be made in detail to embodiments, examples of which are illustrated in the accompanying drawings. However, the present invention may be embodied in many different forms and should not be construed as being limited to the embodiments set forth herein.

Meanwhile, in the following description, with respect to constituent elements used in the following description, the suffixes "module" and "unit" are used or combined with each other only in consideration of ease in the preparation of the specification, and do not have or indicate mutually different meanings. Accordingly, the suffixes "module" and "unit" may be used interchangeably, and may be replaced with "assembly" or the like.

It will be understood that although the terms "first," "second," etc., may be used herein to describe various components, these components should not be limited by these terms. These terms are only used to distinguish one component from another component.

Figure 1:
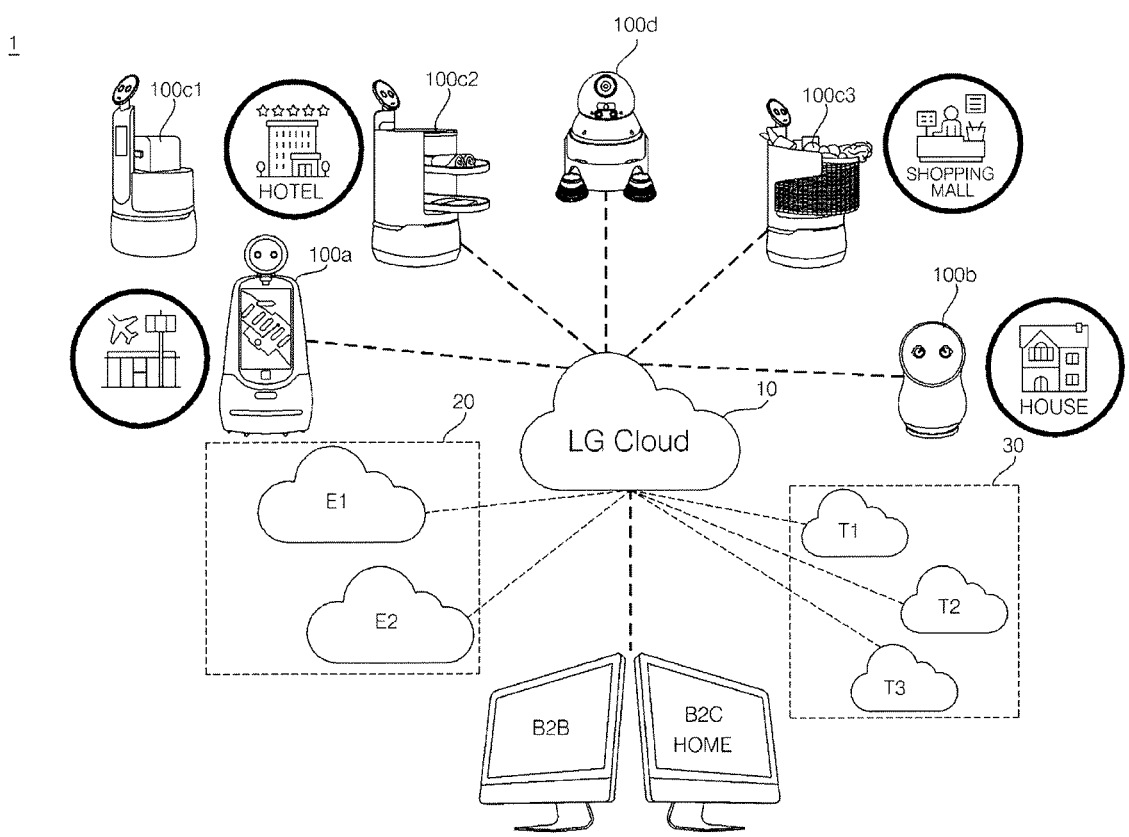
FIG. 1 is a view showing the construction of a robot system according to an embodiment of the present invention.

FIG. 1 is a view showing the construction of a robot system according to an embodiment of the present invention.

Referring to FIG. 1, the robot system 1 according to an embodiment of the present invention may include one or more robots 100a, 100b, 100c1, 100c2, and 100c3 in order to provide services at various places, such as an airport, a hotel, a mart, a clothing store, a logistics center, and a hospital. For example, the robot system 1 may include at least one of a guide robot 100a for providing information about a specific place, article, and service, a home robot 100b for interacting with a user at home and communicating with another robot or electronic device based on user input, delivery robots 100c1, 100c2, and 100c3 for delivering specific articles, or a cleaning robot 100d for performing cleaning while autonomously traveling.

Preferably, the robot system 1 according to an embodiment of the present invention includes a plurality of robots 100a, 100b, 100c1, 100c2, 100c3, and 100d and a server 10 for administrating and controlling the robots 100a, 100b, 100c1, 100c2, 100c3, and 100d.

The server 10 may remotely monitor and control the state of the robots 100a, 100b, 100c1, 100c2, 100c3, and 100d, and the robot system 1 may provide more effective services using the robots 100a, 100b, 100c1, 100c2, 100c3, and 100d.

More preferably, the robot system 1 includes various kinds of robots 100a, 100b, 100c1, 100c2, 100c3, and 100d. Consequently, it is possible to provide various kinds of services through the respective robots and to provide more varying and convenient services through cooperation between the robots 100a, 100b, 100c1, 100c2, 100c3, and 100d.

Each of the robots 100a, 100b, 100c1, 100c2, 100c3, and 100d and the server 10 may include a communication means that supports one or more communication protocols in order to communicate with each other. In addition, the robots 100a, 100b, 100c1, 100c2, 100c3, and 100d and the server 10 may communicate with a PC, a mobile terminal, another external server, any external device, or any combination thereof.

For example, the robots 100a, 100b, 100c1, 100c2, 100c3, and 100d and the server 10 may communicate with each other using a message queuing telemetry transport (MQTT) scheme.

Alternatively, the robots 100a, 100b, 100c1, 100c2, 100c3, and 100d and the server 10 may communicate with each other using a hypertext transfer protocol (HTTP) scheme.

In addition, the robots 100a, 100b, 100c1, 100c2, 100c3, and 100d and the server 10 may communicate with a PC, a mobile terminal, any external device, or another external server using the HTTP and/or MQTT scheme.

Depending on circumstances, the robots 100a, 100b, 100c1, 100c2, 100c3, and 100d and the server 10 may support two or more communication protocols, and may use the optimum communication protocol depending on the kind of communication data or the kind of a device participating in communication.

The server 10 may be realized as a cloud server, whereby a user may use data stored in the server 10 and a function or service provided by the server 10 using any of various devices, such as a PC or a mobile terminal, which is connected to the server. The cloud server 10 may be operatively connected to the robots 100a, 100b, 100c1, 100c2, 100c3, and 100d in order to monitor and control the robots 100a, 100b, 100c1, 100c2, 100c3, and 100d and to remotely provide various solutions and content.

The user may retrieve or control information about the robots 100a, 100b, 100c1, 100c2, 100c3, and 100d in the robot system using the PC or the mobile terminal.

In this specification, the "user" is a person who uses a service through at least one robot, and may include an individual customer who purchases or borrows a robot in order to use the robot at home, a manager or a staff member of a company who provides services to the staff or customers using a robot, and customers who use services provided by the company. Consequently, the "user" may include an individual customer (business to consumer; B2C) and a business customer (business to business; B2B).

The user may monitor the state and location of the robots 100a, 100b, 100c1, 100c2, 100c3, and 100d in the robot system and may administrate content and task schedules, using the PC or the mobile terminal.

Meanwhile, the server 10 may store and administrate information received from the robots 100a, 100b, 100c1, 100c2, 100c3, and 100d and other devices.

The server 10 may be a server that is provided by a manufacturing company of the robots 100a, 100b, 100c1, 100c2, 100c3, and 100d in the robot system 1 and may administrate content and task schedules or a company to which the manufacturing company entrusts services.

Meanwhile, the system according to the present invention may be operatively connected to two or more servers 10, 20.

For example, the server 10 may communicate with external cloud servers 20, such as E1 and E2, and with third parties 30 providing content and services, such as T1, T2, and T3. Consequently, the server 10 may be operatively connected to the external cloud servers 20 and with third parties 30 in order to provide various kinds of services.

The server 10 may be a control server for administrating and controlling the robots 100*a*, 100*b*, 100*c*1, 100*c*2, 100*c*3, and 100*d*.

The server 10 may simultaneously or individually control the robots 100*a*. 100*b*, 100*c*1, 100*c*2, 100*c*3, and 100*d*. In addition, the server 10 may group at least some of the robots 100*a*, 100*b*, 100*c*1, 100*c*2, 100*c*3, and 100*d* in order to perform group-based control.

Meanwhile, the server 10 may be configured as a plurality of servers, to which information and functions are distributed, or as a single integrated server.

Since the server 10 is configured as a plurality of servers, to which information and functions are distributed, or as a single integrated server in order to administrate all services using the robots, the server may be called a robot service delivery platform (RSDP).

Figure 2A:
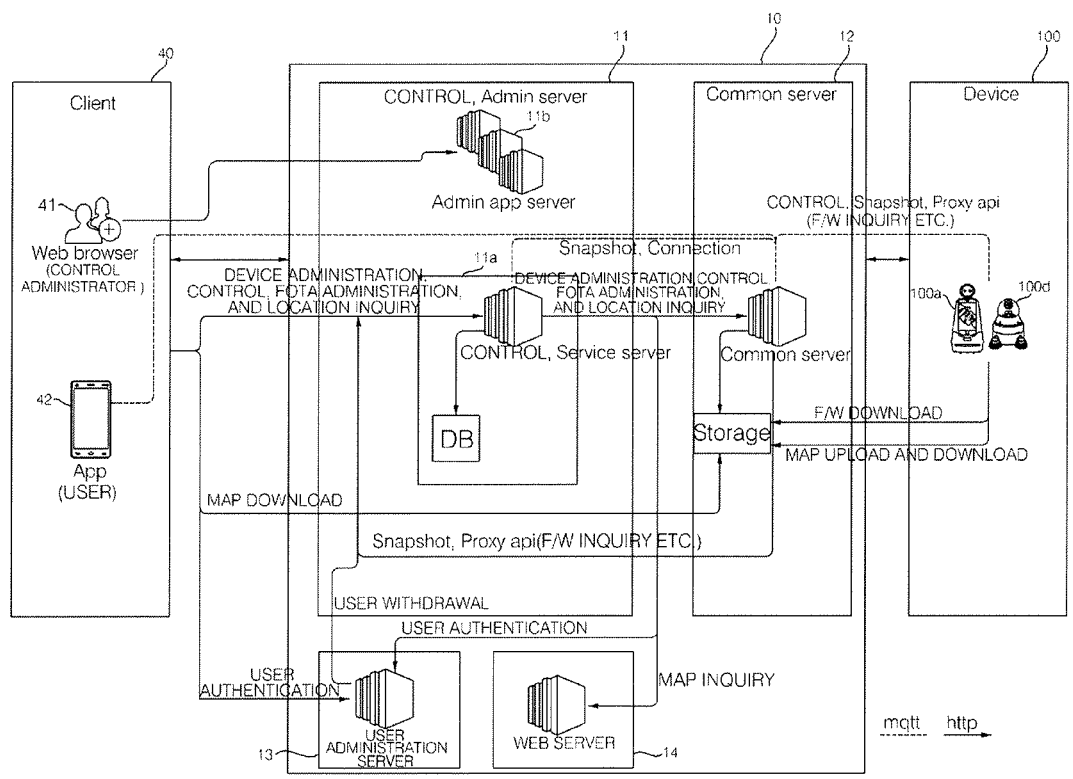
FIGS. 2A and 2B are reference views illustrating a robot service delivery platform included in the robot system, according to the embodiment of the present invention.
Figure 2B:
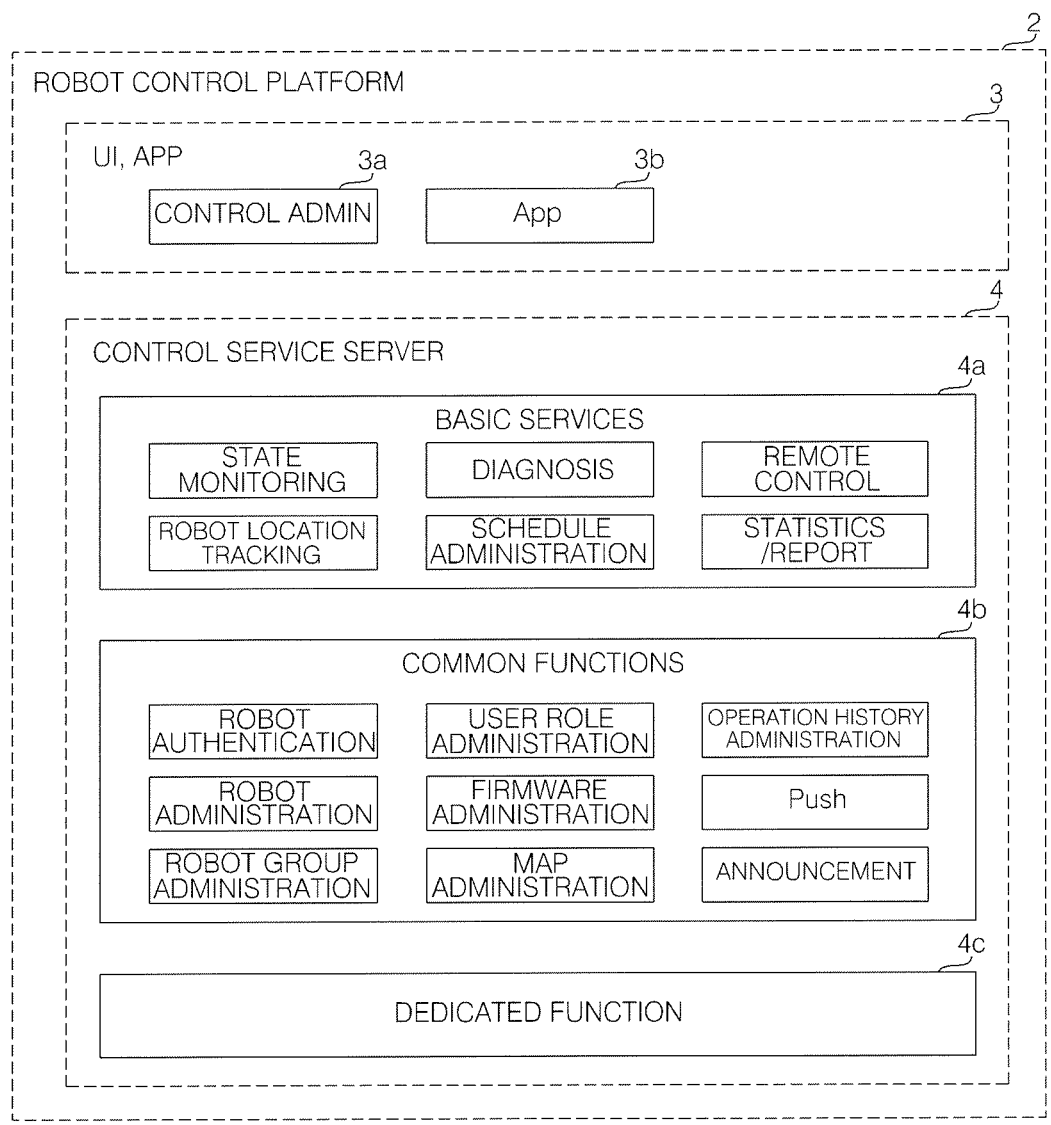

FIGS. 2*a* and 2*b* are reference views illustrating a robot service delivery platform included in the robot system according to the embodiment of the present invention.

FIG. 2A exemplarily shows a communication architecture of a robot service delivery platform according to an embodiment of the present invention.

Referring to FIG. 2A, the robot service delivery platform 10 may include one or more servers 11 and 12 in order to administrate and control robots 100, such as the guide robot 100*a* or the cleaning robot 100*d*.

The robot service delivery platform 10 may include a control server 11 for communicating with a client 40 through a web browser 41 or an application 42 in a mobile terminal and administrating and controlling the robots 100 and a device administration server 12 for relaying and administrating data related to the robot 100.

The control server 11 may include a control/service server 11*a* for providing a control service capable of monitoring the state and location of the robots 100 and administrating content and task schedules based on user input received from the client 40 and an administrator application server 11*b* that a control administrator is capable of accessing through the web browser 41.

The control/service server 11*a* may include a database, and may respond to a service request and a location inquiry from the client 40, such as robot administration, control, firmware over the air (FOTA) upgrade.

The control administrator may access the administrator application server 11*b* under the authority of the administrator, and the administrator application server 11*b* may administrate functions related to the robot 100, applications, and content.

The device administration server 12 may function as a proxy server, and store metadata related to original data, and may perform a data backup function utilizing a snapshot indicating the state of a storage device.

The device administration server 12 may include storage for storing various kinds of data and a common server for communicating with the control/service server 11*a*. The common server may store various kinds of data in the storage, may retrieve data from the storage, and may respond to a service request and a location inquiry from the control/service server 11*a*, such as robot administration, control, firmware over the air.

In addition, the robots 100 may download map data and firmware data stored in the storage.

Since the control server 11 and the device administration server 12 are separately configured, it is not necessary to retransmit data after storing the data in the storage, where there is an advantage in terms of the processing speed and time and effective administration is easily achieved in terms of security.

Meanwhile, the robot service delivery platform 10 is a set of servers that provide services related to the robot, and may mean all components excluding the client 40 and the robots 100 in FIG. 2A.

For example, the robot service delivery platform 10 may further include a user administration server 13 for administrating user accounts. The user administration server 13 may administrate user authentication, registration, and withdrawal.

In some embodiments, the robot service delivery platform 10 may further include a map server 14 for providing map data and data based on geographical information.

The map data received by the map server 14 may be stored in the control server 11 and/or the device administration server 12, and the map data in the map server 14 may be downloaded by the robots 100. Alternatively, the map data may be transmitted from the map server 14 to the robots 100 according to a request from the control server 11 and/or the device administration server 12.

The robots 100 and the servers 11 and 12 may include a communication means that support one or more communication protocols in order to communicate with each other.

Referring to FIG. 2A, the robots 100 and the servers 11 and 12 may communicate with each other using the MQTT scheme. The MQTT scheme is a scheme in which a message is transmitted and received through a broker, and is advantageous in terms of low power and speed. Meanwhile, in the case in which the robot service delivery platform 10 uses the MQTT scheme, the broker may be constructed in the device administration server 12.

In addition, the robots 100 and the servers 11 and 12 may support two or more communication protocols, and may use the optimum communication protocol depending on the kind of communication data or the kind of a device participating in communication. FIG. 2A exemplarily shows a communication path using the MQTT scheme and a communication path using the HTML scheme.

Meanwhile, the servers 11 and 12 and the robots 100 may communicate with each other using the MQTT scheme irrespective of the kind of the robots.

The robots 100 may transmit the current state thereof to the servers 11 and 12 through an MQTT session, and may receive remote control commands from the servers 11 and 12. For MQTT connection, a digital certificate of authentication, such as a personal key (issued for SCR generation), an X.509 certificate of authentication received at the time of robot registration, or a certificate of device administration server authentication, or may other authentication schemes may be used.

In FIG. 2A, the servers 11, 12, 13, and 14 are classified based on the functions thereof. However, the present invention is not limited thereto. Two or more functions may be performed by a single server, and a single function may be performed by two or more servers.

FIG. 2B exemplarily shows a block diagram of the robot service delivery platform according to the embodiment of the present invention, and exemplarily shows upper-level applications of a robot control platform related to robot control.

Referring to FIG. 2B, the robot control platform 2 may include a user interface 3 and functions/services 4 provided by the control/service server 11*a*.

The robot control platform 2 may provide a website-based control administrator user interface 3*a* and an application-based user interface 3*b*.

The client 40 may use the user interface 3*b*, provided by the robot control platform 2, through their own device.

Meanwhile, referring to FIG. 2B, the control/service server 11*a* may include common units 4*a* and 4*b* including functions and services that are commonly applied to the robots and a dedicated unit 4*c* including specialized functions related to at least one of the robots 100.

In some embodiments, the common units 4*a* and 4*b* may be divided into basic services 4*a* and common functions 4*b*.

The common units 4*a* and 4*b* may include a state monitoring service capable of checking the state of the robots 100, a diagnostic service capable of diagnosing the state of the robots 100, a remote control service capable of remotely controlling the robots 100, a robot location tracking service capable of tracking the location of the robots 100, a schedule administration service capable of assigning, checking, and modifying tasks of the robots 100, and a statistics/report service capable of checking various kinds of statistical data and analysis reports.

In addition, the common units 4*a* and 4*b* may include a user roll administration function of administrating the authority of a robot authentication function user, an operation history administration function, a robot administration function, a firmware administration function, a push function related to a push notification, a robot group administration function capable of setting and administrating groups of robots, a map administration function capable of checking and administrating map data and version information, and an official announcement administration function.

The dedicated unit 4*c* may include specialized functions considering the places at which the robots 100 are operated, the kind of services, and the requests of customers. The dedicated unit 4*c* may mainly include specialized functions for B2B customers. For example, in the case of the cleaning robot 100*d*, the dedicated unit 4*c* may include a cleaning area setting function, a site-based state monitoring function, a cleaning schedule setting function, and a cleaning history inquiry function.

Meanwhile, the specialized functions provided by the dedicated unit 4*c* may be based on functions and services that are commonly applied. For example, the specialized functions may be configured by modifying the basic services or adding predetermined services to the basic services of the common unit 4*a*. Alternatively, the specialized functions may be configured by modifying some of the common functions of the common unit 4*b*.

In this case, the basic services or the common functions corresponding to the specialized functions provided by the dedicated unit 4*c* may be removed or inactivated.

Figure 3:
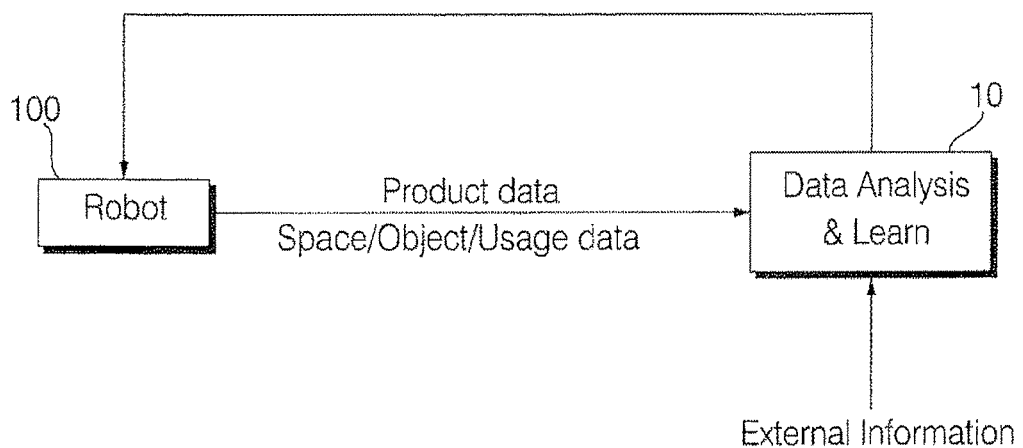
FIG. 3 is a reference view illustrating learning using data acquired by a robot according to an embodiment of the present invention.

FIG. 3 is a reference view illustrating learning of the robot using data acquired by a robot according to an embodiment of the present invention.

Referring to FIG. 3, product data acquired by the operation of a predetermined device, such as a robot 100, may be transmitted to the server 10.

For example, the robot 100 may transmit space-related, object-related, and usage-related data to the server 10.

Figure 8:
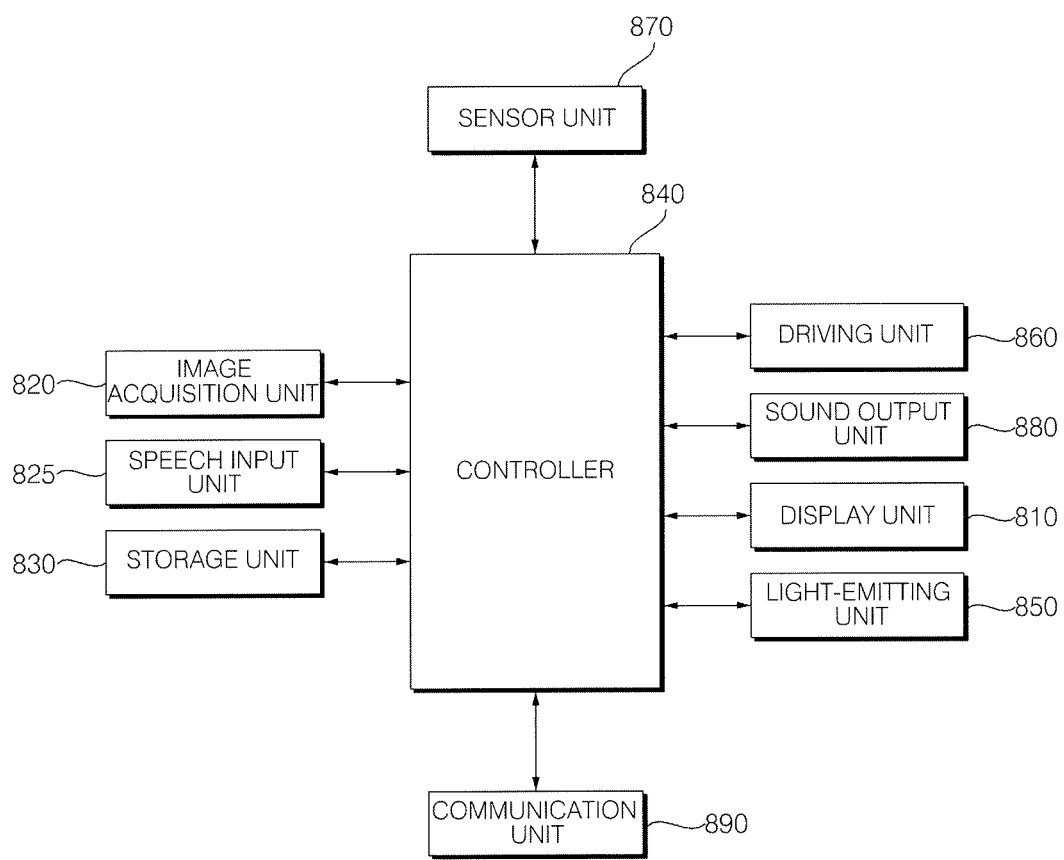
FIG. 8 is a block diagram showing a control relationship between the principal components of the mobile robot according to an embodiment of the present invention.

Here, the space-related and object-related data may be recognition-related data of a space (i.e., a space the robot is present) and object recognized by the robot 100 or image data about the space and the object acquired by an image acquisition unit 820 (illustrated in FIG. 8).

In some embodiments, the robot 100 and the server 10 may include a software-type or hardware-type artificial neural network (ANN) trained to recognize at least one of the attributes of users, the attributes of speeches, the attributes of spaces, or the attributes of objects, such as obstacles.

In an embodiment of the present invention, the robot 100 and the server 10 may include a deep neural network (DNN) trained using deep learning, such as a convolutional neural network (CNN), a recurrent neural network (RNN), or a deep belief network (DBN). For example, the deep neural network (DNN), such as the convolutional neural network (CNN), may be provided in a controller 840 (illustrated in FIG. 8) of the robot 100.

The server 10 may train the deep neural network (DNN) based on the data received from the robot 100 and data input by a user, and may transmit the updated data of the deep neural network (DNN) to the robot 100. Consequently, the deep neural network (DNN) included in the robot 100 may be updated.

In addition, the usage-related data, which are data acquired as the result of using a predetermined product, for example, the robot 100, may include usage history data and sensing data acquired by a sensor unit 870 (illustrated in FIG. 8).

The trained deep neural network (DNN) may receive input data for recognition, may recognize the attributes of a person, an object, and a space included in the input data, and may output the result.

In addition, the trained deep neural network (DNN) may receive input data for recognition, and may analyze and trained usage-related data of the robot 100 in order to recognize the usage pattern and the usage environment.

Meanwhile, the space-related, object-related, and usage-related data may be transmitted to the server 10 through a communication unit 890 (illustrated in FIG. 8).

The server 10 may train the deep neural network (DNN) based on the received data, and may transmit the updated data of the deep neural network (DNN) to the robot 100 such that the robot 100 is updated.

Consequently, a user experience (UX) in which the robot 100 becomes smarter and evolves as the result of repetitive use, may be provided.

The robot 100 and the server 10 may use external information. For example, the server 10 may synthetically use external information acquired from other service servers 20 and 30 connected thereto in order to provide an excellent user experience.

The server 10 may receive a speech input signal from a user in order to perform speech recognition. To this end, the server 10 may include a speech recognition module, and the speech recognition module may include an artificial neural network trained to perform speech recognition with respect to input data and to output the result of speech recognition.

In some embodiments, the server 10 may include a speech recognition server for speech recognition. In addition, the speech recognition server may include a plurality of servers for performing assigned tasks of the speech recognition. For example, the speech recognition server may include an automatic speech recognition (ASR) server for receiving speech data and converting the received speech data into text data and a natural language processing (NLP) server for receiving the text data from the automatic speech recognition server and analyzing the received text data in order to determine a speech command. Depending on circumstances, the speech recognition server may further include a text-to-speech (TTS) server for converting the text speech recognition result output by the natural language processing server into speech data and transmitting the speech data to another server or to another device.

According to the embodiment, user speech may be used as an input for controlling the robot 100, since the robot 100 and/or the server 10 are capable of performing speech recognition.

In addition, according to the embodiment, the robot 100 may actively provide information or output speech for recommending a function or a service first, whereby it is possible to provide more varying function and positive control functions to the user.

In addition, according to an embodiment of the present invention, the robot 100 may provide a virtual fitting service. More preferably, a mobile robot capable of autonomously moving provides a virtual fitting service, whereby it is possible to more accurately determine body information of a user and to provide a convenient virtual fitting service. For example, a mobile robot according to an embodiment of the present invention may be a guide robot 100a capable of providing guidance to a specific place, article, or service and providing various kinds of services. Hereinafter, an embodiment in which the guide robot 100a provides a virtual fitting service will be described.

Figure 4:
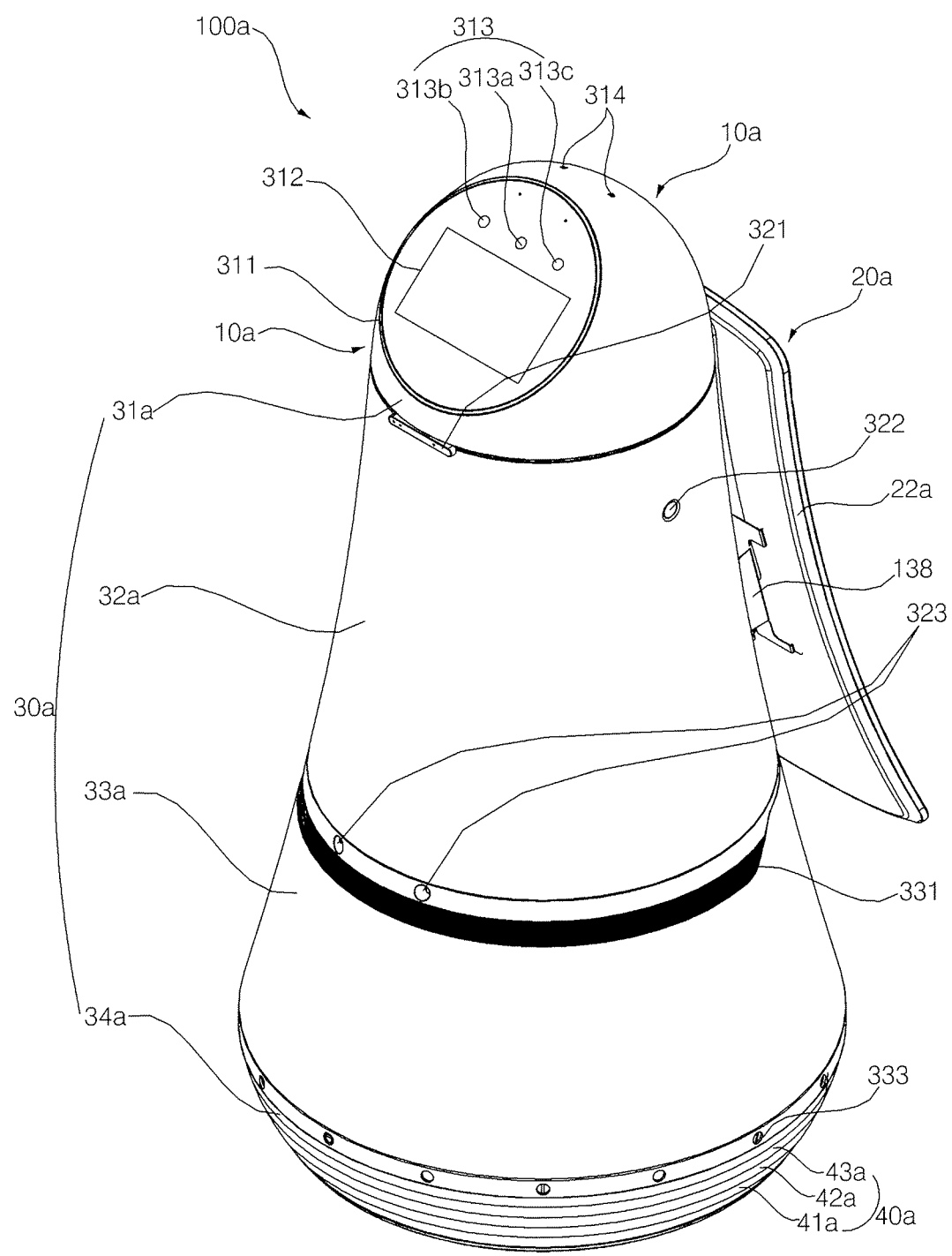
FIG. 4 is a perspective view showing a mobile robot according to an embodiment of the present invention.
Figure 5:
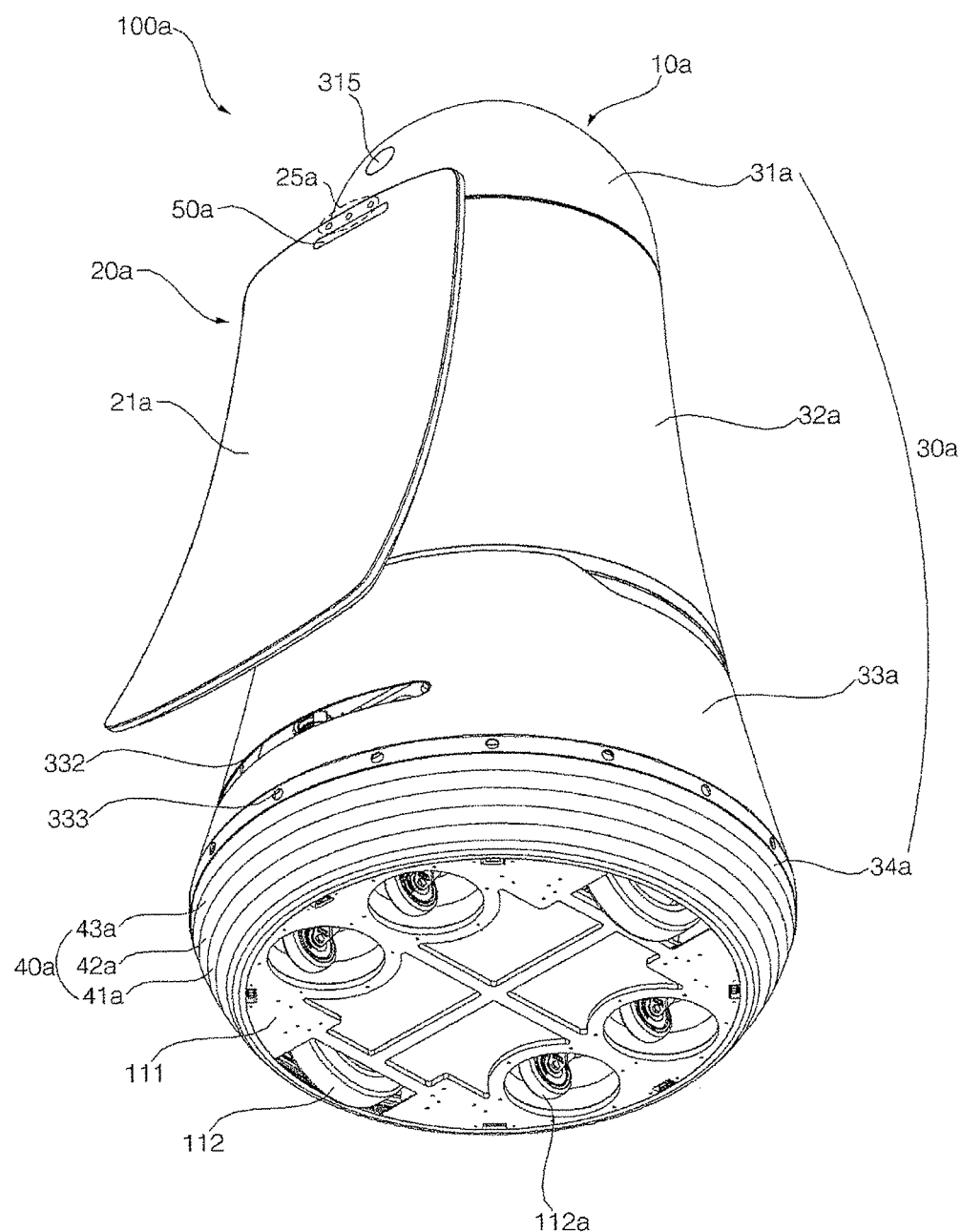
FIG. 5 is a bottom perspective view of the mobile robot according to the embodiment of the present invention when viewed from below.
Figure 6:
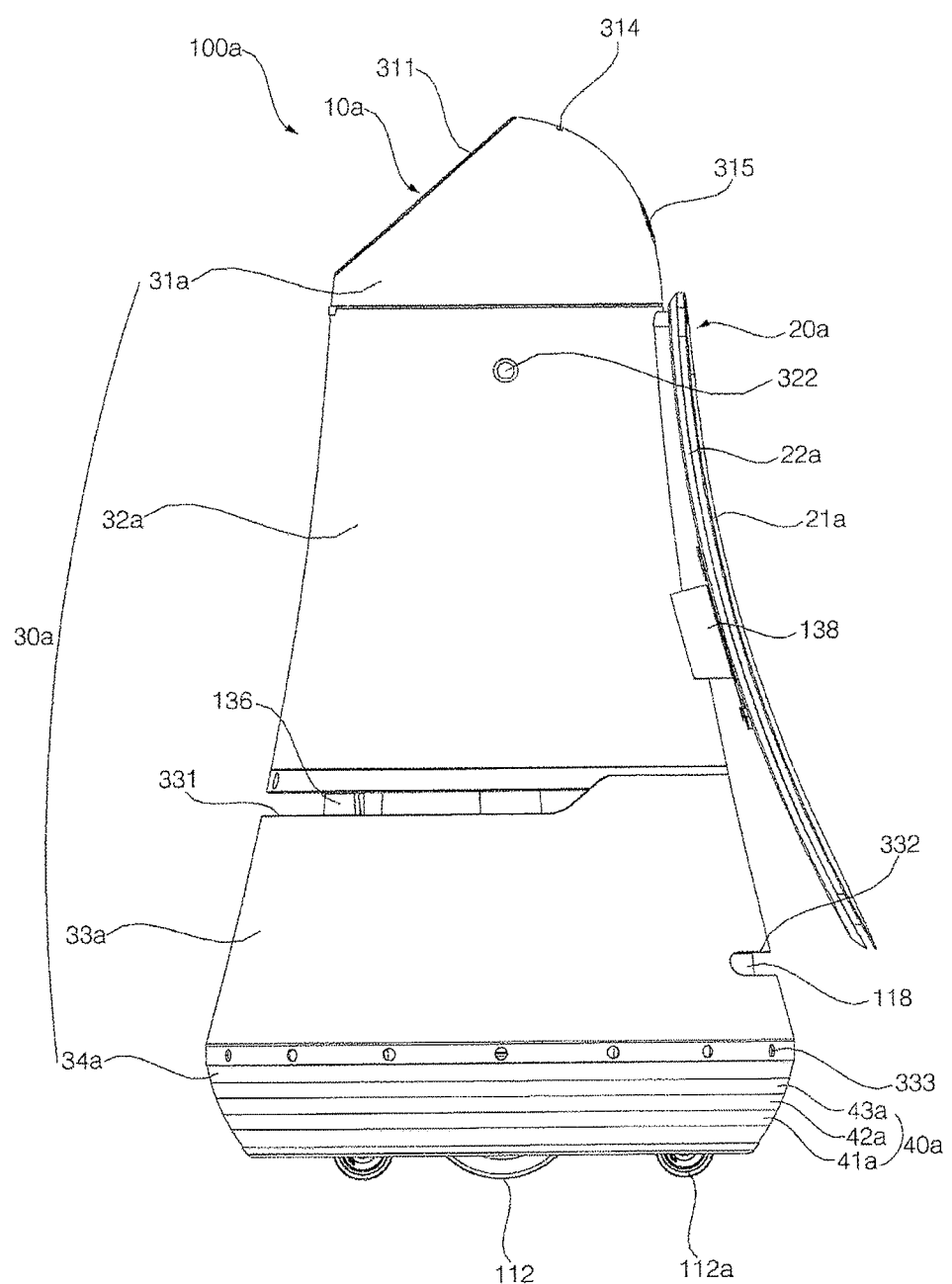
FIG. 6 is a side view of the mobile robot according to the embodiment of the present invention.

FIG. 4 is perspective view showing a mobile robot according to an embodiment of the present invention, FIG. 5 is a bottom perspective view of the mobile robot according to the embodiment of the present invention when viewed from below, and FIG. 6 is a side view of the mobile robot according to the embodiment of the present invention.

Referring to FIGS. 4 to 6, the mobile robot 100a according to the embodiment of the present invention may include a main body 10a, which defines the external appearance thereof and in which various components are received.

The main body 10a may be formed so as to be longer in the upward-downward direction (i.e., vertical direction), and may generally have the shape of a tumbling doll, which gradually slims from bottom to top of the mobile robot 100a.

The main body 10a may include a case 30a, which defines the external appearance of the mobile robot 100a. The case 30a may include a top cover 31a disposed at an upper side of the mobile robot 100a, a first middle cover 32a disposed at the lower side of the top cover 31a, a second middle cover 33a disposed at the lower side of the first middle cover 32a, and a bottom cover 34a disposed at the lower side of the second middle cover 33a. Here, the first middle cover 32a and the second middle cover 33a may be configured as a single middle cover.

The top cover 31a may be located at the uppermost end of the mobile robot 100a, and may have a hemispherical or dome shape. The top cover 31a may be located lower than the height of an adult so as to allow a user to easily input a command. The top cover 31a may be configured to be rotatable by a predetermined angle.

Meanwhile, the top cover 31a may be disposed at the uppermost end of the mobile robot 100a, may have various components disposed therein, and may have a shape and function similar to the head of a person in order to interact with a user. Consequently, the top cover 31a and the component disposed therein may be called a head. In addition, components received in or disposed outside the top cover 31a may be called a head unit. Meanwhile, the other components disposed at the lower side of the head may be called a body.

The top cover 31a may include an operation unit (i.e., operation assembly) 311 disposed at one side of the front surface of the top cover 31a. The operation unit 311 may receive a user command. To this end, the operation unit 311 may include a display 312 for receiving user touch input.

The display 312 disposed on the operation unit 311 may be called a first display or a head display 312, and a display 21a included in a body display unit (i.e., display assembly) 20a disposed at the body may include a second display 21a or a body display 21a.

The head display 312 may be connected to a touchpad in a layered structure so as to constitute a touchscreen. In this case, the head display 312 may also be used as an input device for allowing a user to input information by touch, in addition to an output device.

In addition, the operation unit 311 may be directed upwards at a predetermined angle such that the user can easily manipulate the head display 312 while looking down at the head display 312. For example, the operation unit 311 may be disposed on a surface formed by cutting a portion of the top cover 31a. That is, the top cover 31a may have an aperture for receiving the operation unit 311 and the operation unit 311 may be inclined with respect to a vertical direction (i.e., the extension direction of the robot 100a). Consequently, the head display 312 may be disposed so as to be inclined.

In addition, the operation unit 311 may generally have a circular or oval external shape. The operation unit 311 may be realized so as to be similar to the facial shape of a person.

In an example, the operation unit 311 may have a circular shape, and one or more structures expressing the eyes, nose, mouth, and eyebrows of a person may be located on the operation unit 311.

That is, specific structures expressing the eyes, nose, mouth, and eyebrows of a person may be disposed on the operation unit 311, or a specific paint may be laid (i.e., provided) thereon. Consequently, the operation unit 311 may have a human facial shape, whereby it is possible to elicit an emotional response. Furthermore, in the case in which a robot having a human facial shape travels, a sensation as if a person moved may be provided, whereby it is possible to overcome reluctance to the robot.

In another example, one or more images expressing the eyes, nose, mouth, and eyebrows of a person may be displayed on the head display 312.

That is, not only information related to a guide service and a virtual fitting service but also various images expressing a human facial shape may be displayed on the head display 312. In addition, an image expressing a predetermined facial expression at a predetermined time interval or at a specific time may be displayed on the head display 312.

Meanwhile, in FIG. 4, the direction in which the body display unit 20a or the display 21a is directed is defined as the "rear," and the direction opposite to the "rear" is defined as the "front."

In addition, a head camera unit (i.e., head camera assembly) 313 for person and object recognition may be disposed on the operation unit 311.

The head camera unit 313 may be disposed at the upper side of the head display 312. The head camera unit 313 may include a 2D camera 313a and RGB-D sensors 313b and 313c.

The 2D camera 313a may be a sensor for recognizing a person or an object based on a two-dimensional image.

In addition, the RGB-D (red, green, blue, and distance) sensors 313b and 313c may be sensors for acquiring the location, a facial image, or a body image of a person. The RGB-D sensors 313b and 313c may be sensors for detecting a person or an object using a captured image having depth data acquired by a camera having RGB-D sensors or another similar 3D imaging device. In addition, the RGB-D sensors 313b and 313c may capture an image of a user located within a predetermined distance, and may scan the body of the user.

In order to accurately detect the location, the facial image, or the body image of a person, a plurality of RGB-D sensors 313b and 313c may be provided. In an example, two RGB-D sensors 313b and 313c may be disposed at the left side and the right side of the 2D camera 313a, respectively.

The head camera unit 313 may include a 3D vision sensor, such as an RGB-D camera sensor, and may sense whether a person is present within a predetermined distance, whether a target to be guided is present in a guide mode, the distance between a person and the mobile robot 100a, the movement speed of a person, and physical information of a user.

Meanwhile, the operation unit 311 may further include a physical button for allowing a user to directly input a command.

In addition, the top cover 31a may further include a microphone 314 or a plurality of microphones.

The microphone 314 may receive an audio signal command input by a user. In an example, four microphones 314 may be formed at predetermined positions on the upper end of the top cover 31a in order to accurately receive a speech command from the user. Consequently, even during traveling of the mobile robot 100a or even during the rotation of the top cover 31a, it is possible to accurately receive a speed service request from the user.

In an embodiment of the present invention, the top cover 31a may be rotated during traveling of the mobile robot 100a such that the operation unit 311 is directed in the traveling direction thereof. Upon receiving a command (e.g. a speech command) from the user during traveling of the mobile robot 100a, the top cover 31a may be rotated so as to be directed toward the user.

Upon receiving a command from the user during traveling of the mobile robot 100a, the top cover 31a may be rotated in a direction opposite to the traveling direction of the mobile robot 100a. That is, the top cover 31a may be rotated in a direction in which the body display unit (i.e., body display, body display assembly) 20a is directed. Consequently, the user may effectively manipulate the operation unit 311 while looking at load guide service information displayed on the body display unit 20a.

Figure 7:
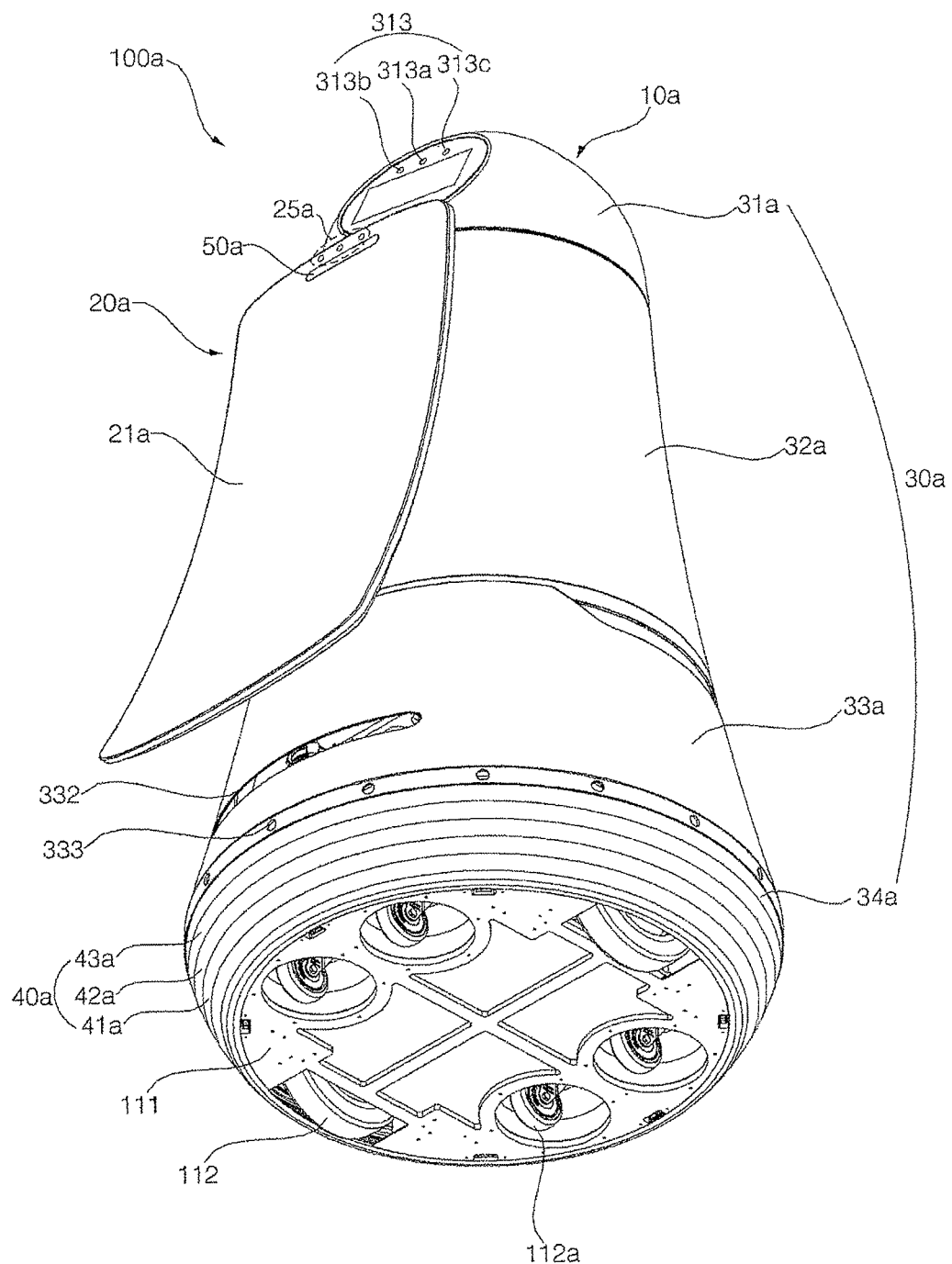
FIG. 7 is a bottom perspective view of the mobile robot showing that the displays of the mobile robot are aligned according to an embodiment of the present invention.

FIG. 7 is a view showing that the displays 312 and 21a of the mobile robot 100a are aligned according to an embodiment of the present invention.

Referring to FIG. 7, when the mobile robot 100a receives a command from a user in an interaction state or is on standby, the displays 312 and 21a may be aligned in one direction such that the user or people in a public place can more easily look at information displayed on the two displays 312 and 21a.

The interaction state may be the state in which the mobile robot 100a provides a speech guide or a menu screen to a predetermined user, the state in which the mobile robot 100a receives user touch input or speech input, or the state in which the mobile robot 100a provides a service.

Meanwhile, the directions in which the operation unit 311 and the body display unit 20a face may be opposite each other. In this case, for example, the operation unit 311 may face in one direction, and the body display unit 20a may face in a direction opposite the one direction, whereby it is possible to bi-directionally look at information displayed on the operation unit 311 or the body display unit 20a. That is, the operation unit 311 and the body display unit 20a may face opposite directions to allow for users in different positions to view information on a respective one of the displays 312 and 21a. However, the display 21a can be rotate to be at any position relative to the display 312.

Preferably, the directions in which the operation unit 311 and the body display unit 20a face are changed in the state in which the mobile robot 100a is traveling or stops.

For example, in the case in which the mobile robot 100a is traveling, as shown in FIG. 4, the directions in which the operation unit 311 and the body display unit 20a face may be opposite each other.

Also, in the case in which the mobile robot 100a is on standby (e.g., stopped and waiting for a command or a user input), as shown in FIG. 7, the directions in which the operation unit 311 and the body display unit 20a face may be the same as each other.

In addition, the top cover 31a may further include an emergency operation button 315. The emergency operation button 315 may immediately stop the operation of the mobile robot 100a when the mobile robot 100a is on standby or is traveling. In an example, the emergency operation button 315 may be located at the rear of the mobile robot 100a such that the emergency operation button 315 can be easily manipulated even in the case in which the mobile robot 100a travels forwards. Alternatively, the emergency operation button 315 may be provided on any position of the mobile robot 100a.

The first middle cover 32a may be disposed at the lower side of the top cover 31a. Various kinds of electronic components, including a circuit board, may be located in the first middle cover 32a. The first middle cover 32a may have a cylindrical shape having a diameter gradually increasing from the top to bottom.

More preferably, the first middle cover 32a may include an RGB-D sensor 321.

The RGB-D sensor 321 may sense collision or possible collision between the mobile robot 100a and an obstacle during traveling of the mobile robot 100a. To this end, the RGB-D sensor 321 may be located in the direction in which the mobile robot 100a travels, i.e. at the front of the first middle cover 32a. In an example, the RGB-D sensor 321 may be located at the upper end of the first middle cover 32a in consideration of an obstacle present in front of the mobile robot 100a or the height of a person. However, the present invention is not limited thereto. The RGB-D sensor 321 may be disposed at various positions on the front of the first middle cover 32a.

In some embodiments, the RGB-D sensor 321 may be configured as a 3D vision sensor, and may sense whether a person is present within a predetermined distance, whether a target to be guided is present in a guide mode, the distance between a person and the mobile robot 100a, the movement speed of a person, etc. In addition, the RGB-D sensor 321 may capture an image of a user located within a predetermined distance, and may scan the body of the user.

In some embodiments, the RGB-D sensor 321 may not be disposed at the first middle cover 32a, and the function of the RGB-D sensor 321 may be performed by the head camera unit 313.

In addition, the first middle cover 32a may further include a speaker hole 322.

The speaker hole 322 may be a hole for transmitting sound generated by a speaker outwards. The speaker hole 322 may be formed in the outer circumferential surface of the first middle cover 32a, and a single speaker hole may be formed. Unlike this, a plurality of speaker holes 322 may be formed in the outer circumferential surface of the first middle cover 32a so as to be spaced apart from each other.

In addition, the first middle cover 32a may further include a stereo camera hole 323 or multiple stereo camera holes 323.

The stereo camera hole 323 may be a hole for the operation of a stereo camera installed in the main body 10a. The stereo camera may be a camera with two or more lenses, with a separate image sensor in each lens. In an example, the stereo camera hole 323 may be formed at the lower end of the front of the first middle cover 32a. Consequently, the stereo camera may capture an image of an area in front of the mobile robot 100a through the stereo camera hole 323.

The second middle cover 33a may be disposed at the lower side of the first middle cover 32a. A battery and a lidar (light detection and ranging, a device that is similar in operation to radar but emits pulsed laser light instead of microwaves) for autonomous traveling may be located in the second middle cover 33a. In the same manner as the first middle cover 32a, the second middle cover 33a may have a cylindrical shape having a diameter gradually increasing from the top to bottom. The outside of the second middle cover 33a may be connected to the outside of the first middle cover 32a without forming a step. That is, the outside of the second middle cover 33a and the outside of the first middle cover 32a may be smoothly connected to each other, whereby an aesthetically pleasing appearance may be provided.

In addition, since the first middle cover 32a and the second middle cover 33a have a cylindrical shape having a diameter gradually increasing from top to bottom, the first middle cover and the second middle cover may have a shape of a tumbling doll. Consequently, it is possible to eliminate (avoid or minimize) impact generated when the main body 10a collides with a person or an object.

Specifically, the second middle cover 33a may include a first opening 331.

The first opening 331 may be formed from the front to the side of the outer circumferential surface of the second middle cover 33a. The first opening 331 is a part formed in the second middle cover 33a such that a front lidar 136, a description of which will follow, is operable. The front lidar 136 is illustrated in FIG. 6.

Specifically, the first opening 331 may be formed at the outer circumferential surface of the front of the second middle cover 33a so as to extend a predetermined distance in the radial direction thereof. Here, the front lidar 136 is located in the second middle cover 33a. The first opening 331 may be formed at the outer circumferential surface of the second middle cover 33a corresponding to the position of the front lidar 136 so as to extend along the circumference of the second middle cover 33a. That is, the first opening 331 and the front lidar 136 may face each other. Consequently, the front lidar 136 may be exposed outwards through the first opening 331.

In an example, the first opening 331 may be formed at the front of the second middle cover 33a so as to extend up to 270 degrees along the circumference thereof. The reason that the first opening 331 must be formed in the second middle cover 33a is that it is necessary to prevent a laser emitted by the front lidar 136 from being directly irradiated to the eyes of an adult or a child.

In addition, the second middle cover 33a may further include a second opening 332, illustrated in FIG. 6.

The second opening 332 may be formed from the rear to the side of the outer circumferential surface of the second middle cover 33a. The second opening 332 is a part formed in the second middle cover 33a such that a rear lidar 118, a description of which will follow, is operable.

Specifically, the second opening 332 may be formed at the outer circumferential surface of the rear of the second middle cover 33a so as to extend a predetermined distance in the radial direction thereof. Here, the rear lidar 118 is located in the second middle cover 33a. The second opening 332 may be formed at the portion of the second middle cover 33a corresponding to the position of the rear lidar 118 so as to extend along the circumference of the second middle cover 33a. Consequently, the rear lidar 118 may be exposed outwards through the second opening 332. In an example, the second opening 332 may be formed at the rear of the second middle cover 33a so as to extend up to 130 degrees along the circumference thereof.

In this embodiment, the first opening 331 and the second opening 332 may be spaced apart from each other in the upward-downward (i.e., vertical) direction so as not to be connected to each other. In addition, the first opening 331 may be located higher than the second opening 332.

If the first opening 331 and the second opening 332 are located on the same line, a laser emitted by a lidar of a mobile robot 100a may be irradiated to a lidar of another mobile robot 100a. As a result, the lasers emitted by the lidars 136, 118 of the mobile robots 100a may interfere with each other, whereby accurate distance detection may be difficult. In this case, it may be impossible to detect the distance between the mobile robot 100a and an obstacle, whereby normal traveling of the mobile robot 100a may be difficult and the mobile robot 100a may collide with an obstacle.

In addition, an ultrasonic sensor 333 may be further disposed at the second middle cover 33a.

The ultrasonic sensor 333 may be a sensor for measuring the distance between an obstacle and the mobile robot 100a using an ultrasonic signal. The ultrasonic sensor 333 may sense an obstacle that is near the mobile robot 100a.

In an example, a plurality of ultrasonic sensors 333 may be provided in order to sense obstacles that are near the mobile robot 100a in all directions. The ultrasonic sensors 333 may be located along the circumference of the lower end of the second middle cover 33a so as to be spaced apart from each other.

The bottom cover 34a may be disposed at the lower side of the second middle cover 33a. A wheel 112 and a caster 112a may be located in the bottom cover 34a. Further, the wheel 112 may be provided in plurality and the caster 112a may be provided in plurality. In addition, the bottom cover 34a may have a cylindrical shape having a diameter gradually decreasing from the top to bottom, unlike the first middle cover 32a and the second middle cover 33a. That is, the main body 10a may generally have the shape of a tumbling doll, whereby the amount of impact applied at the time of collision of the robot 100a may be reduced. In addition, since the lower end of the main body 10a is concave inwards, it is possible to prevent feet of a person from being caught by the wheel of the robot 100a.

Specifically, a base 111 may be located inside the bottom cover 34a.

The base 111 may define the bottom surface of the mobile robot 100a.

A wheel 112 for traveling of the mobile robot 100a may be provided at the base 111. The wheel 112 may be provided at each of left and right sides of the base 111.

In addition, a caster 112a for assisting the travel of the mobile robot 100a may be provided at the base 111. A plurality of casters 112a may be provided in order to manually move the mobile robot 100a. In an example, two casters 112a may be located at each of the front and the rear of the base 111.

In the above caster structure, it is possible to easily push the mobile robot 100a in order to move the mobile robot 100a in the case in which the power of the mobile robot 100a is turned off or it is necessary to manually move the mobile robot 100a.

Light-emitting modules 40a, each of which includes one or more light-emitting diodes (LEDs), may be disposed at the bottom cover 34a, and at least one of the light-emitting modules 40a may be turned on or off depending on the operation state of the mobile robot 100a. For example, at least one of the light-emitting modules 40a may output a predetermined color light or may blink in a predetermined cycle depending on the operation state of the mobile robot 100a. In addition, two or more of the light-emitting modules 40a may output light in a predetermined pattern depending on the operation state of the mobile robot 100a.

Each of the light-emitting modules 40a may include one or more light-emitting diodes as a light source thereof. In the case in which a plurality of light sources is provided, the light sources may be arranged in a predetermined pitch in order to uniformly supply light. The number and pitch of light sources may be set in consideration of luminous intensity. In addition, all of the light sources may be white, or colors of adjacent light sources may be mixed to output white light, or may be any color.

Each light source may include a single light-emitting diode or a light-emitting diode assembly in which a plurality of light-emitting diodes is disposed so as to be adjacent to each other. In addition, for example, each light source may include red, blue, and green (the three primary colors of light) light-emitting diodes disposed so as to be adjacent to each other.

Preferably, the light-emitting modules 40a are disposed along the circumference of the bottom cover 34a. For example, the light-emitting modules 40a may be disposed on an arbitrary circle surrounding the circumference of the bottom cover 34a in the horizontal direction.

Since the light-emitting modules 40a are disposed at the bottom cover 34a, which is the lower end of the mobile robot 100a, the light-emitting modules may be located much lower than the height of the eyes of a person. When the light-emitting modules 40a output specific light or blink (e.g., have pulsating light), therefore, the eyes of people may be less dazzled.

Since the light-emitting modules 40a are disposed so as to surround the circumference of the bottom cover 34a in the horizontal direction, people may see light output by the light-emitting modules 40a in all directions of 360 degrees.

Since the light-emitting modules 40a are disposed at the bottom cover 34a, the light-emitting modules 40a are spaced apart from the large-sized body display 21a for displaying a predetermined image by a predetermined distance. Consequently, it is possible to prevent light output by the light-emitting modules 40a from deteriorating visibility of an image output by the body display 21a or to prevent an image output by the body display 21a from deteriorating visibility of light output by the light-emitting modules 40a.

In addition, the light-emitting modules 40a may be disposed in multiple columns while having a plurality of rows. Consequently, it is possible to further improve visibility of light output by the light-emitting modules 40a.

For example, the light-emitting modules 40a may be disposed in three rows 41a, 42a, and 43a having different lengths. In this case, the row 41a, which is the lowermost one of the three rows 41a, 42a, and 43a, may have the smallest length (or smallest circumference).

More preferably, the light-emitting modules 40a are disposed so as to have a plurality of rows and columns. For example, the light-emitting modules 40a may be disposed in three rows 41a. 42a, and 43a, and each of the rows 41a, 42a, and 43a may include a plurality of light-emitting modules 40a configured to be independently controllable. Consequently, the light-emitting modules 40a may have a plurality of rows and columns, and may be disposed in a matrix of M*N when being spread.

The body display unit 20a may be formed at one side of the mobile robot 100a so as to extend in the upward-downward direction.

Specifically, the body display unit 20a may include a body display 21a and a support 22a.

The body display 21a may be located at the rear of the first middle cover 32a. The body display 21a may output visual information related to a service that is being provided (e.g., airport gate question information and load guide service information).

In addition, the body display 21a may be configured as a curved display having a shape that is curved outwards so as to have a predetermined curvature. That is, the body display 21a may generally have a concave shape, including having a cross-sectional shape that is concave, as shown in FIG. 6. In addition, the body display 21a may have a shape that is gradually inclined from top to bottom. The body display 21a may be formed so as to be gradually farther away from the case 30a from top to bottom. That is, the spacing between the body display 21a and the case 30a may increase from top to bottom.

In the structure of the display unit 20a, information displayed on the body display 21a is clearly visible even at a position far away from the mobile robot 100a, and the information displayed on the body display 21a is not distorted even at various angles.

In addition, according to an embodiment of the present invention, the mobile robot 100a may move ahead along a predetermined path in order to guide a user. The user may look at the body display unit 20a installed at the rear of the mobile robot 100a while following the mobile robot 100a. That is, even in the case in which the mobile robot 100 travels for guidance, the user may easily look at information displayed on the body display unit 20a while following the mobile robot 100a.

In addition, the upper end of the body display 21a may extend to the upper end of the first middle cover 32a, and the lower end of the body display 21a may extend to the second opening 332. In this embodiment, the lower end of the body display 21a must be formed so as not to extend over the second opening 332. If the body display 21a is formed so as to cover the second opening 332, a laser emitted by the rear lidar 118 collides with the lower end of the body display 21a. As a result, it may be impossible to detect the distance between the mobile robot 100a and an obstacle located at the rear thereof.

Meanwhile, the support 22a may maintain the body display 21a at the rear of the first middle cover 32a. The support 22a may be formed and extend at the rear surface of the body display unit 20a. The support 22a may be formed at the rear surface of the body display 21a so as to extend in the upward-downward direction, and may gradually protrude from top to bottom.

In addition, the support 22a may be inserted into the first middle cover 32a through the rear of the first middle cover 32a. To this end, a through-hole, through which the support 22a extends, may be formed at the rear of the first middle cover 32a. The through-hole may be formed by cutting a portion of the rear of the outer circumferential surface of the first middle cover 32a.

The body display unit 20a may be fixed in the main body 10 using a separate fixing member 138.

The fixing member 138, which fixes the body display unit 20a to the main body 10a, may be provided in the main body 10a, and may be provided in the first middle cover 32a of the main body 10a. One side of the fixing member 138 may be fixed to the main body 10a, and the other side of the fixing member may be fixed to the body display unit 20a. To this end, the other side of the fixing member 138 may protrude out of the case 30a through the through-hole. That is, both the support 22a and the fixing member 138 may be located in the through-hole.

In this embodiment, the body display unit 20a may be fastened to the fixing member 138 using a fastening means. At this time, the support 22a of the body display unit 20a may be laid on the upper side of the fixing member 138. In other words, the support 22a may be laid on the upper side of the fixing member 138, and a portion of the fixing member 138 may be fixed to a portion of the body display unit 20a. In the display unit fixing structure, the body display unit 20a may be stably located at the rear of the first middle cover 32a.

In addition, the body display unit 20a may further include a ticket insertion slot 50a. In an embodiment, the ticket insertion slot 50a may be disposed at the body display unit 20a. However, the present invention is not limited thereto. The ticket insertion slot 50a may be disposed at a predetermined position of the mobile robot 100a.

Meanwhile, the mobile robot 100a may be provided with a scanner for scanning a ticket that is inserted through the ticket insertion slot 50a, and the scanner may be activated under the control of a controller 840. The scanner may be provided inside the body display unit 20a and may be provided inside of the ticket insertion slot 50a.

According to an embodiment of the present invention, when a ticket, such as an exchange ticket, an airport ticket, or a baggage ticket, is inserted through the ticket insertion slot 50a, the scanner provided in the mobile robot 100a may scan a barcode or a QR code included in the ticket.

In addition, the mobile robot 100a may display the result of scanning on the body display 21a, and may provide information about the result of scanning to a user.

Meanwhile, the body display unit 20a may further include a body camera unit 25a for identifying and tracking a service target.

The body camera unit 25a may include an RGB-D camera sensor or a 3D vision sensor, and may sense whether a person is present within a predetermined distance, whether a target to be guided is present in a guide mode, the distance between a person and the mobile robot 100a, the movement speed of a person, etc.

In some embodiments, the mobile robot 100a may not include the body camera unit 25a, but may include a sensor for identifying and tracking a target to be guided, which may be disposed at a predetermined position thereof. Additionally, the mobile robot 100a may include the body camera unit 25a and a sensor for identifying and tracking a target to be guided.

FIG. 8 is a block diagram showing a control relationship between principal components of the mobile robot 100a according to an embodiment of the present invention.

Referring to FIG. 8, the mobile robot 100a according to an embodiment of the present invention may include a speech input unit 825 for receiving user speech input through the microphone 314, a storage unit 830 for storing various kinds of data, a communication unit 890 for transmitting and receiving data to and from another electronic device, such as a server 10, a light-emitting unit 850 including one or more light-emitting modules for outputting light outwards, and a controller 840 for controlling the overall operation of the mobile robot 100a.

The speech input unit 825 may include or may be connected to a processing unit for converting analog sound into digital data such that a user speech input signal can be recognized by the controller 840 or the server 10.

The controller 840 may control the speech input unit 825, the storage unit 830, the light-emitting unit 850, and the communication unit 890, which constitute the robot 100a, whereby the controller may control the overall operation of the mobile robot 100a.

The storage unit 830, which stores various kinds of information necessary to control the mobile robot 100a, may include a volatile or nonvolatile recording medium. Examples of the recording medium, which stores data readable by a microprocessor, may include a hard disk drive (HDD), a solid state disk (SSD), a silicon disk drive (SDD), a ROM, a RAM, a CD-ROM, a magnetic tape, a floppy disk, and an optical data storage device.

In addition, the storage unit 830 may store various kinds of information necessary for the mobile robot 100a to provide a guide service or a fitting service.

In addition, the controller 840 may perform control such that the operation state of the mobile robot 100a or user input is transmitted to the server through the communication unit 890.

The communication unit 890 may include at least one communication module, through which the mobile robot 100a may be connected to the Internet or to a predetermined network.

Meanwhile, the storage unit 830 may store data for speech recognition, and the controller 840 may process the user speech input signal received through the speech input unit 825, and may perform a speech recognition process.

Meanwhile, the controller 840 may perform control such that the mobile robot 100a performs a predetermined operation based on the result of speech recognition.

For example, in the case in which a command included in a speech signal is a command for requesting predetermined information, the controller 840 may perform control such that the predetermined information is displayed on the display unit 810.

Also, in the case in which there is a user request for a guide service, the controller 840 may perform control such that the user is escorted to a destination selected by the user.

Also, in the case in which there is a user request for a virtual fitting service, the controller 840 may perform control such that the body of the user is scanned in order to provide the virtual fitting service. The user request may be a voice input received from the microphone 314 or a touch input to the display 312.

Meanwhile, the speech recognition process may be performed by the server 10, not by the mobile robot 100a.

In this case, the controller 840 may control the communication unit 890 such that the user speech input signal is transmitted to the server 10, and may receive the result of recognition of the speech signal from the server through the communication unit 890.

Alternatively, simple speech recognition, such as recognition of a wake-up word, may be performed by the mobile robot 100*a*, and high-dimensional speech recognition, such as natural language processing, may be performed by the server 10.

Meanwhile, the mobile robot 100*a* may include a display unit (i.e., display assembly) 810 for displaying predetermined information in the form of an image and a sound output unit 880 for displaying predetermined information in the form of sound.

The display unit 810 may display information corresponding to user request input, a processing result corresponding to the user request input, the operation mode, the operation state, and the error state in the form of an image.

As described above with reference to FIGS. 4 to 7, the display unit 810 may include a head display 312 and a body display 21*a*. Since the body display 21*a* is realized to have a larger size than the head display 312, it is preferable to display information on the body display 21*a* as a large-sized screen.

In addition, the sound output unit 880 may output an alarm sound, a notification message about the operation mode, the operation state, and the error state, information corresponding to user request input, and a processing result corresponding to the user request input in the form of sound under the control of the controller 840. The sound output unit 880 may convert an electrical signal from the controller 840 into an audio signal, and may output the audio signal. To this end, a speaker may be provided in the speaker hole 322.

Meanwhile, the mobile robot 100*a* may include an image acquisition unit 820 for capturing an image of a predetermined range.

The image acquisition unit 820, which captures an image of the periphery of the mobile robot 100*a*, an external environment, etc., may include a camera module. For capture efficiency, a plurality of cameras may be installed at predetermined positions.

For example, as described above with reference to FIGS. 4 to 7, the image acquisition unit 820 may include a head camera unit 313 for person and object recognition and a body camera unit 25*a* for identifying and tracking a target to be guided. However, the number, disposition, kind, and capture range of cameras included in the image acquisition unit 820 are not limited thereto.

The image acquisition unit 820 may capture an image for user recognition and/or an image for a virtual fitting service. The controller 840 may determine an external situation or may recognize a user and identify the physical information of the user based on the image captured by the image acquisition unit 820.

In addition, the controller 840 may perform control such that the mobile robot 100*a* travels based on the image captured by the image acquisition unit 820.

Meanwhile, the image captured by the image acquisition unit 820 may be stored in the storage unit 830.

Meanwhile, the mobile robot 100*a* may further include a driving unit 860 for movement, and the driving unit 860 may move the main body 10*a* under the control of the controller 840.

The driving unit (i.e., driving assembly) 860 may include at least one driving wheel 112 for moving the main body 10*a* of the mobile robot 100*a*. The driving unit 860 may include a driving motor connected to the driving wheel 112 for rotating the driving wheel. Driving wheels 112 may be provided at left and right sides of the main body 10*a*, and will hereinafter be referred to as a left wheel and a right wheel.

The left wheel and the right wheel may be driven by a single driving motor. If necessary, however, a left wheel driving motor for driving the left wheel and the right wheel driving motor for driving the right wheel may be individually provided. The direction in which the main body 10*a* travels may be changed to the left or to the right based on the difference in the rotational speed between the left wheel and the right wheel.

Meanwhile, the mobile robot 100*a* may include a sensor unit 870 including sensors for sensing various kinds of data related to the operation and state of the mobile robot 100*a*.

The sensor unit 870 may include an obstacle sensor for sensing an obstacle. The obstacle sensor may include an infrared sensor, an ultrasonic sensor, an RF sensor, a geomagnetic sensor, and a position sensitive device (PSD) sensor. For example, the obstacle sensor may be the ultrasonic sensor 333 or the RGB-D sensor 321 described above with reference to FIGS. 4 to 7.

In addition, the sensor unit 870 may further include a cliff sensor 113 for sensing whether a cliff is present on a floor within a traveling area. The cliff sensor 113 may be a contact that runs along the ground with movement of the robot 100*a*, and when a drop off is encountered, the cliff sensor 113 may communicate with the controller 840 to indicate the drop off.

In some embodiments, the sensor unit 870 may further include a sensor for sensing the magnitude of sound acquired through the microphone 314. Consequently, it is possible to sense the magnitude of user speech and the magnitude of ambient noise.

Alternatively, no separate sensor may be included, but the speech input unit 825 may determine the magnitude of user speech and the magnitude of ambient noise while processing a signal acquired through the microphone 314.

In addition, the sensor unit 870 may include lidars (light detection and ranging) 136 and 118.

The lidars 136 and 118 may detect an object, such as an obstacle, based on time of flight (TOF) of a transmission signal and a reception signal or a phase difference between the transmission signal and the reception signal through the medium of a laser light.

In addition, the lidars 136 and 118 may detect the distance to an object, the velocity relative to the object, and the position of the object.

The lidars 136 and 118 may be some of the components constituting the obstacle sensor. In addition, the lidars 136 and 118 may be configured as sensors for map preparation.

Meanwhile, the obstacle sensor senses an object, particularly an obstacle, present in the direction in which the mobile robot travels (moves), and transmits information about the obstacle to the controller 840. At this time, the controller 840 may control the movement of the mobile robot 100*a* depending on the position of the sensed obstacle.

Meanwhile, the sensor unit 870 may further include an operation sensor for sensing the operation of the mobile robot 100*a* based on driving of the main body 10*a* and outputting operation information. For example, a gyro sensor, a wheel sensor, or an acceleration sensor may be used as the operation sensor.

The gyro sensor senses the rotational direction of the mobile robot 100*a* and detects the rotational angle of mobile robot when the mobile robot moves according to an operation mode. The mobile robot 100*a* detects the angular velocity of the mobile robot 100*a*, and outputs a voltage value proportional to the angular velocity. The controller 840 calculates the rotational direction and rotational angle of the mobile robot 100*a* using the voltage value output from the gyro sensor.

The wheel sensor is connected to each of the left and right wheels in order to sense the number of rotations of the wheel. Here, the wheel sensor may be a rotary encoder. The rotary encoder senses and outputs the number of rotations of each of the left and right wheels.

The controller 840 may calculate the rotational velocity of each of the left and right wheels using the number of rotations thereof. In addition, the controller 840 may calculate the rotational angle of the mobile robot 100*a* using a difference in the number of rotations between the left wheel and the right wheel.

The acceleration sensor senses a change of the mobile robot 100*a* based on a change in the velocity of the mobile robot 100*a*, e.g. start, stop, direction change, or collision with an object. The acceleration sensor may be attached to a position adjacent to a main wheel or an auxiliary wheel in order to detect slippage or idling of the wheel.

In addition, the acceleration sensor may be mounted in the controller 840 in order to sense a change in the velocity of the mobile robot 100*a*. That is, the acceleration sensor detects the amount of impact depending on the change in the velocity of the mobile robot 100*a*, and outputs a voltage value corresponding thereto. Consequently, the acceleration sensor may function as an electronic bumper.

The controller 840 may calculate a change in the position of the mobile robot 100*a* based on the operation information output from the operation sensor. This position is a relative position, which corresponds to an absolute position using image information. The mobile robot 100*a* is capable of improving the performance of position recognition using the image information and the obstacle information through such relative position recognition.

The light-emitting unit 850 may include a plurality of light-emitting modules. For example, as described with reference to FIGS. 4 to 7, the light-emitting unit 850 may include light-emitting modules 40*a*, each of which includes one or more light-emitting diodes (LEDs).

In addition, the light-emitting modules 40*a* may be disposed at the bottom cover 34*a*, and the light-emitting modules 40*a* may be operated under the control of the controller 840.

For example, the controller 840 may perform control such that at least one of the light-emitting modules 40*a* outputs a predetermined color of light or blinks in a predetermined cycle depending on the operation state of the mobile robot 100*a*. In addition, the controller 840 may perform control such that two or more of the light-emitting modules 40*a* output light in a predetermined pattern depending on the operation state of the mobile robot 100*a*.

Each of the light-emitting modules 40*a* of the light-emitting unit 850 may include one or more light sources. For example, each of the light-emitting modules 40*a* may include one or more light-emitting diodes (LEDs).

There is limitation in accurately controlling the luminous intensity of a conventional analog-type illuminator; however, it is possible to accurately control the luminous intensity of a light-emitting diode (LED) by adjusting the amount of current that is supplied thereto and the width of a drive pulse. Also, in the case in which R, G, and B light-emitting diodes (LEDs) are combined and installed, it is possible to provide a specific color of light and to easily adjust color temperature.

The light-emitting diode (LED) may be a single-color light-emitting diode (LED), such as a red light-emitting diode, a blue light-emitting diode, a green light-emitting diode, or white light-emitting diode. In some embodiments, the light-emitting diode (LED) may be a multi-color light-emitting diode (LED) capable of reproducing a plurality of colors.

In addition, each of the light-emitting modules 40*a* may include a plurality of light-emitting diodes (LEDs), and the light-emitting diodes (LEDs) emit white light, thereby providing white illumination. Alternatively, red, blue, and green light-emitting diodes (LEDs) may be combined in order to provide specific-color illumination or white illumination.

For example, the light-emitting modules 40*a* may output a first color (white) of light indicating a normal operation state, a second color (yellow) of light indicating a pause state, and a third color (red) of light indicating stop or an error state.

The light-emitting modules 40*a* may serve as a kind of signal lamp that indicates the current operation state through the color or pattern of the light output therefrom and that informs people of the traveling state or the operation state of the mobile robot 100*a*.

In addition, the controller 840 may control the light-emitting unit 850.

For example, the controller 840 may perform control such that at least one of the light-emitting modules 40*a* outputs a predetermined color of light depending on the current state of the mobile robot 100*a*. In addition, the controller 840 may perform control such that at least one of the light-emitting modules 40*a* blinks for a predetermined time in a predetermined cycle.

In the case in which a user approaches the mobile robot 100*a* for information confirmation, setting input, or other operation, or a child touches the mobile robot 100*a* out of curiosity, during movement (traveling) of the mobile robot 100*a*, a safety-related accident, such as a collision, may occur if the mobile robot 100*a* continues to travel.

In particular, there is a high floating population in public places, such as an airport, a railroad station, a terminal, a department store, and a mart, and therefore there are many unexpected variables. As a result, there is a higher danger of the occurrence of a safety-related accident.

For this reason, the mobile robot 100*a* according to the present invention may output a light indicating the current operation state of the mobile robot 100*a* through the light-emitting unit 850 when being operated in a public place, whereby it is possible to provide signal information informing people in the public place of the current state of the mobile robot 100*a*. Consequently, it is possible to reduce a possibility of the occurrence of an accident between people and the mobile robot 100*a* in the public place.

Since the light-emitting modules 40*a* are disposed at the bottom cover 34*a*, which is the lower end of the mobile robot 100*a*, so as to be spaced apart from the second display 21*a*, the light-emitting modules 40*a* may be located lower than the height of the eyes of a person and the second display 21*a*. When the light-emitting modules 40*a* output specific light or blink, therefore, the eyes of people may be less dazzled. In addition, it is possible to prevent light output by the light-emitting modules 40*a* from deteriorating visibility of an image output by the body display 21*a* or to prevent an image output by the body display 21*a* from deteriorating visibility of light output by the light-emitting modules 40*a*.

Preferably, the light-emitting modules 40*a* are disposed along the circumference of the bottom cover 34*a*. Since the light-emitting modules 40*a* are disposed so as to surround the circumference of the bottom cover 34*a* in the horizontal direction, people may see light output by the light-emitting modules 40*a* in all directions of 360 degrees.

Meanwhile, the light-emitting modules 40*a* may be disposed in multiple columns while having a plurality of rows. Consequently, it is possible to further improve visibility of light output by the light-emitting modules 40*a*.

Figure 9:
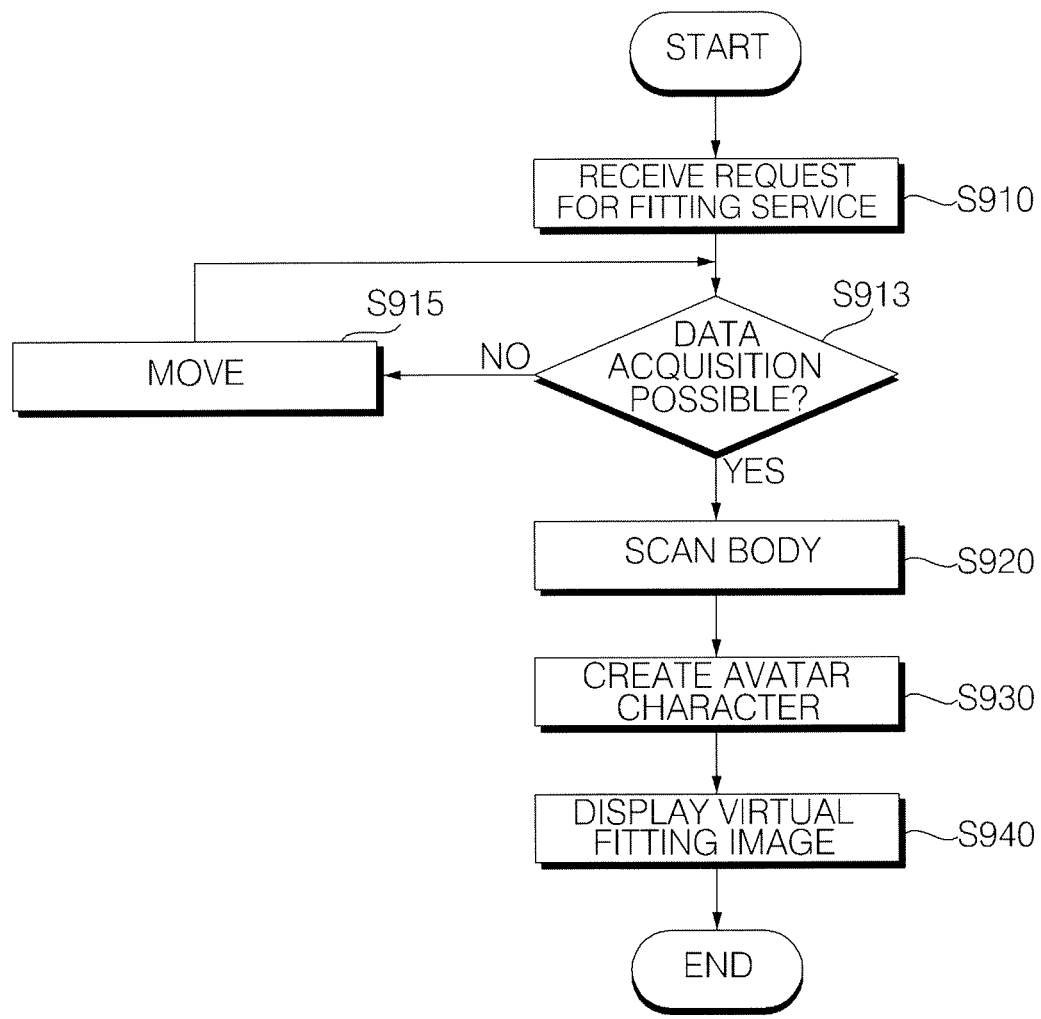
FIG. 9 is a flowchart showing a method of controlling the mobile robot according to an embodiment of the present invention.

FIG. 9 is a flowchart showing a method of controlling the mobile robot 100*a* according to the embodiment of the present invention.

Referring to FIG. 9, the robot 100*a* according to the embodiment of the present invention may receive user input including a request for a fitting service (S910). More preferably, the mobile robot 100*a* according to the embodiment of the present invention receives user input including a request for a fitting service (S910).

The fitting service provided by the mobile robot 100*a* according to the embodiment of the present invention may be a virtual fitting service of creating an avatar of a user and the created avatar of the user virtually wearing clothes.

In the case in which a consumer directly wears many clothes, a long time may be necessary to select clothes to be worn, to go to a fitting room and come back while holding the clothes, and to try on the clothes, which may be inconvenient. In the case in which the virtual fitting service is used, however, it is possible for the consumer to virtually wear clothes through their avatar and to rapidly change clothes.

The mobile robot 100*a* may receive user touch or speech input including a request for the fitting service. In this case, the user may deviate from the angle of view of the camera included in the image acquisition unit 820 of the mobile robot 100*a*. For example, the user may request the fitting service by voice while moving to the side or the rear of the mobile robot 100*a*. In addition, even in the case in which the user requests the fitting service by touch or speech in front of the mobile robot 100*a*, the user is too close to the camera included in the image acquisition unit 820 of the mobile robot 100*a*, whereby it may be difficult to photograph the user to the extent to which it is possible to scan the body of the user. In some embodiments, it can be controlled to scan more than a predetermined range of the entire body for body scanning. In this case, it may be necessary to acquire image data of 80% or more of the entire body, for example, image data from the knees to the head of the user or from the ankles to the head of the user.

According to an embodiment of the present invention, upon receiving the user input including the request for the fitting service (S910), the controller 840 may determine whether it is possible to acquire image data including a specific body part set in the fitting service at the current position (S913).

Here, the specific body part set in the fitting service may be the entire body.

Alternatively, the specific body part set in the fitting service may be a part from a specific joint to the head of the user, for example, a part from the knees to the head of the user or from the ankles to the head of the user.

Alternatively, the specific body part set in the fitting service may be a part from above a specific joint to the head of the user, for example, a part from above the knees to the head of the user or from above the ankles to the head of the user.

Upon determining that it is not possible to acquire image data including a necessary specific body part based on a predetermined criterion (S913), the controller 840 may control the driving unit 860 such that the mobile robot 100*a* moves to a position at which it is possible to acquire the image data including the specific body part set in the fitting service (S915).

Consequently, it is not necessary for the user to move for body scanning, whereby use convenience may be improved.

Upon determining that it is possible to acquire the image data including the necessary specific body part based on the predetermined criterion (S913) after moving (S915), the mobile robot 100*a* may scan the body of the user through the image acquisition unit 820 (S920).

Alternatively, upon determining that it is possible to acquire the image data including the necessary specific body part based on the predetermined criterion (S913) upon receiving the user input including the request for the fitting service (S910), the mobile robot 100*a* may scan the body of the user through the image acquisition unit 820 (S920).

That is, in the case in which it is possible to acquire the image data including the specific body part set in the fitting service, the mobile robot 100*a* may perform control such that the image acquisition unit 820 scans the body of the user.

Upon determining that it is possible to acquire the image data including the necessary specific body part based on the predetermined criterion (S913) after moving or without moving, the mobile robot 100*a* may scan the body of the user through the image acquisition unit 820 (S920).

The mobile robot 100*a* may photograph the user using one or more 3D vision sensors included in the image acquisition unit 820, and may scan the body of the user.

The user may be photographed in order to acquire image data, and body information of the user may be identified in the acquired image data, and the acquired image data may be stored in the storage unit 830.

The mobile robot 100*a* according to the embodiment of the present invention may scan the body of the user using the RGB-D sensors 313*b* and 313*c* included in the head camera unit 313 or the RGB-D sensor 321 included in the body camera unit 25*a*.

Alternatively, in order to further improve scanning accuracy, the mobile robot 100*a* may scan the body of the user using the RGB-D sensors 313*b* and 313*c* included in the head camera unit 313 and the RGB-D sensor 321 included in the body camera unit 25*a*.

The controller 840 may identify the body information of the user based on user images acquired through the image acquisition unit 820, and may model the body information of the user in order to create a three-dimensional avatar character (S930).

The controller 840 may extract information about each part of the body of the user from the user image (i.e., acquired image data).

For example, the controller 840 may derive an apex of each body part using a skeleton technique, and may estimate the dimensions of the body based on the derived apex in order to identify the body information of the user.

The mobile robot 100*a* may photograph the user using one or more 3D vision sensors included in the image acquisition unit 820 in order to acquire a user image. The user image may include depth data.

The controller 840 may identify the body information of the user, such as the height, arm length, leg length, and positions of joints of the user, from the user image including the depth data.

In some embodiments, the mobile robot 100*a* may communicate with the server 10 during the fitting service.

For example, the mobile robot 100*a* may communicate with the server 10 in order to determine at least one of whether the user is located in front of the mobile robot 100a, how far the user is from the front of the mobile robot 100a, the pose of the user, or the body dimensions of the user. In addition, the mobile robot 100a may utilize data stored in the server 10 in order to create the avatar character.

The mobile robot 100a may transmit data acquired by the image acquisition unit 820 and/or the sensor unit 870 to the server 10, and the server 10 may compare the received data with reference data stored therein in order to identify the pose of the user, the body dimensions of the user, etc. The server 10 may transmit the identified information to the mobile robot 100a.

In some embodiments, the server 10 may include artificial intelligence trained to identify the pose of the user, the body dimensions of the user, etc., based on images. In addition, the artificial intelligence trained in the server 10 may be downloaded to the mobile robot 100a, or artificial intelligence data of the mobile robot 100a may be updated based on the artificial intelligence data trained in the server 10. In this case, the mobile robot 100a may recognize the user image acquired by photographing the user using artificial intelligence trained based on images in order to create the avatar character of the user.

Meanwhile, the controller 840 may identify body type information of the user from the user image.

In some embodiments, the mobile robot 100a may output a message informing of a precaution, a user operation for scanning, etc., on the display unit 810.

For example, in the case in which scanning accuracy is improved when the user stands with open arms, the controller 840 may perform control such that a message requesting the user to stand with open arms is displayed on the display unit 810.

Figure 10:
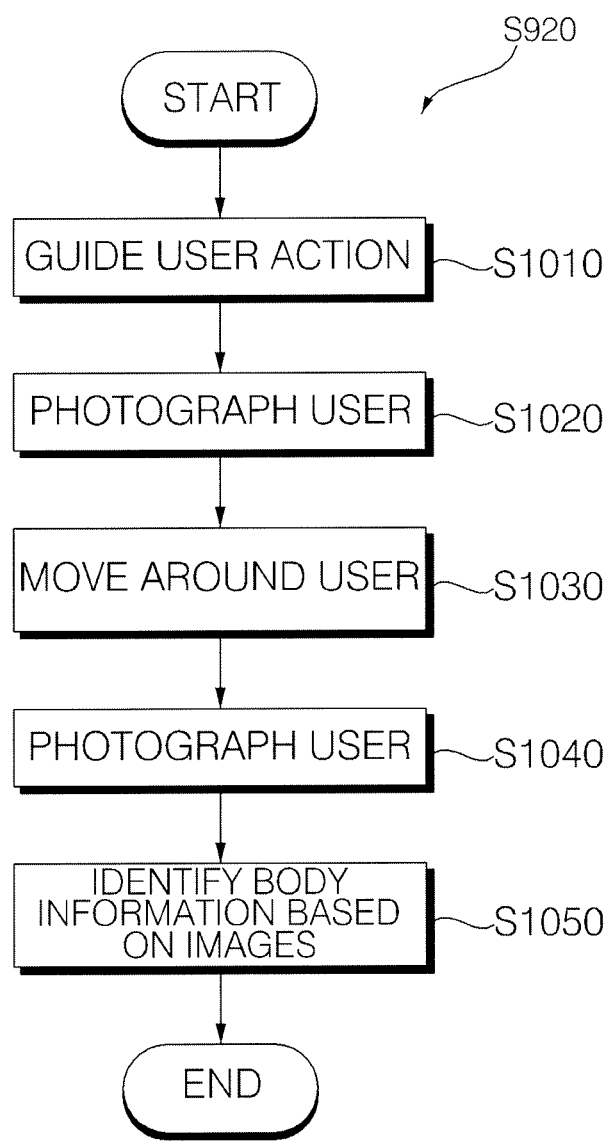
FIG. 10 is a flowchart showing the method of controlling the mobile robot according to an embodiment of the present invention.

FIG. 10 is a flowchart showing the method of controlling the robot according to the embodiment of the present invention, which shows in detail an embodiment including the rotation of the mobile robot 100a at the scanning step (S920).

Referring to FIG. 10, the mobile robot 100a according to the embodiment of the present invention may photograph the user through the image acquisition unit 820 (S1020).

In some embodiments, the mobile robot 100a may first output a message guiding a user action for scanning on the display unit 810 (S1010).

Meanwhile, although it is possible to identify the body information of the user and to create the avatar character by photographing the user once, it is preferable to use a plurality of images of the user captured at different angles in order to improve accuracy in identifying the body information.

To this end, conventionally, a method of photographing the user in a dedicated space in which a plurality of cameras is installed has been proposed. In the case in which the dedicated space is used, however, spatial utilization in a space, for example a clothing store, is deteriorated, and high cost is incurred.

For this reason, the user may be requested to turn 360 degrees in front of a scanning device without providing such a dedicated space.

In the case in which the user turns 360 degrees in a clothing store in which other people are present, the user may feel reluctance and inconvenience. More preferably, therefore, the mobile robot 100a may move around the user (S1030).

After movement (S1030), the mobile robot 100a photographs the user (S1040), whereby it is possible to acquire user images captured at different angles without requesting specific inconvenient actions from the user.

In addition, the controller 840 may identify the body information of the user based on the user images, acquired at the photographing steps (S1020 and S1040), (S1050). Consequently, it is possible to more accurately scan the body of the user using the images captured at various angles.

Meanwhile, the controller 840 may perform control such that images are acquired continuously or periodically during the rotation (S1030).

That is, images captured at different angles are acquired even during rotation (S1030), instead of photographing the user (S1040) only after movement (S1030), whereby it is possible to more accurately scan the body of the user. In order to maximally improve body scanning accuracy, the mobile robot 100a may move 360 degrees around the user in a circle (with the user being the center point of the circle), and may photograph the user continuously or periodically during the movement thereof.

After the photographing step S1040, the robot 100a identifies information based on the images acquired during the photographing steps S1020 and S1040.

At the step of creating the avatar character (S930), the controller 840 may identify the body information of the user (S1050), and may create the avatar character of the user based on the identified body information.

For example, in the case in which scanning accuracy is improved when the user stands with open arms, the controller 840 may perform control such that a message requesting the user to stand with open arms is displayed on the display unit 810.

In addition, the mobile robot 100a may output a message informing of a precaution on the display unit 810.

For example, in the case in which the user wears thick clothes, the controller 840 may perform control such that a message informing of a precaution, such as "the result of body scanning may be different from the actual body," is displayed on the display unit 810.

In addition, the controller 840 may perform control such that text and a graphical image indicating scanning progress are displayed on the display unit 810 during scanning (S920). Consequently, it is possible for the user to intuitively know the level of scanning.

Meanwhile, when scanning (S920) and avatar creation (S930) are completed, the controller 840 may perform control such that a user interface screen including a virtual fitting image is displayed on the display unit 810 (S940).

For example, the controller 840 may perform control such that a user interface screen including a composite image obtained by composing the avatar character of the user created based on the result of scanning and an image of clothes selected by the user is displayed on the display unit 810 (S940).

The user may select clothes before the request for the fitting service (S910), or may request the fitting service (S910) according to the recommendation of the guide robot 100a after selecting clothes.

Alternatively, the user may select clothes after the request for the fitting service (S910).

For example, when the user requests the fitting service (S910), the guide robot 100a may display items corresponding to clothes for which the fitting service is available on the display unit 810, and may receive clothes selection input of the user. Alternatively, after the creation of the avatar character (S930), the guide robot 100a may display items corresponding to clothes for which the fitting service is available on the display unit 810, and may receive clothes selection input of the user.

Meanwhile, the controller 840 may create the avatar character of the user based on the result of scanning (S930), and may display clothes so as to overlap the created avatar character.

In addition, the controller 840 may compose a three-dimensional model of the clothes with the created avatar character.

To this end, the mobile robot 100*a* may receive three-dimensional modeling data of clothes from the server 10.

The server 10 may store image data of clothes for which the fitting service is to be provided and/or three-dimensional modeling data created based on the image data of clothes.

The mobile robot 100*a* may download data necessary for the fitting service, such as three-dimensional modeling data of clothes for which the fitting service is to be provided, from the server 10.

According to this embodiment, it is possible for the robot 100*a* to provide the virtual fitting service while moving, thereby improving use convenience.

In addition, the user may conveniently put various kinds of clothes, such as recommended clothes, on the avatar character in order to purchase clothes that the user likes.

Meanwhile, during or after scanning (S920), a camera view screen of the image acquisition unit 820 may be displayed on the display unit 810.

In this case, body type information based on at least one user image may be displayed on the camera view screen. That is, the controller 840 may display body type information of the user identified based on the user image acquired through primary photographing (S1020) on the camera view screen in order to assist the user in confirming their body type and intuitively recognizing that scanning is being performed.

Meanwhile, in the case of an embodiment including the rotation (S1030), the controller 840 may perform control such that the body type information is changed and displayed according to the rotation (S1030). According to the rotation of the mobile robot 100*a* (S1030), the camera of the image acquisition unit 820 looks at the user (i.e., captures images of the user) in different directions, and captures images at different angles. Consequently, the body type information changed depending on rotation is displayed on the camera view screen, which assists in the user confirming the rotation of the mobile robot 100*a* (S1030) and captured images.

Alternatively, the controller 840 may perform control such that the body type information is changed and displayed according to the motion of the user. Consequently, it is possible for the user to intuitively know how body scanning is affected and performed according to their motion.

In addition, the controller 840 may perform control such that text and a graphical image indicating the body type information and scanning progress are displayed on the display unit 810 during scanning (S920). Consequently, it is possible for the user to intuitively know the level of scanning.

Meanwhile, when scanning (S920) is completed, the controller 840 may perform control such that a message informing of the completion of scanning and information about a recommended size based on the body information of the user are displayed on the display unit 810.

Consequently, it is possible to provide the information about the recommended size based on the result of scanning to the user, in addition to the avatar character.

Figure 11:
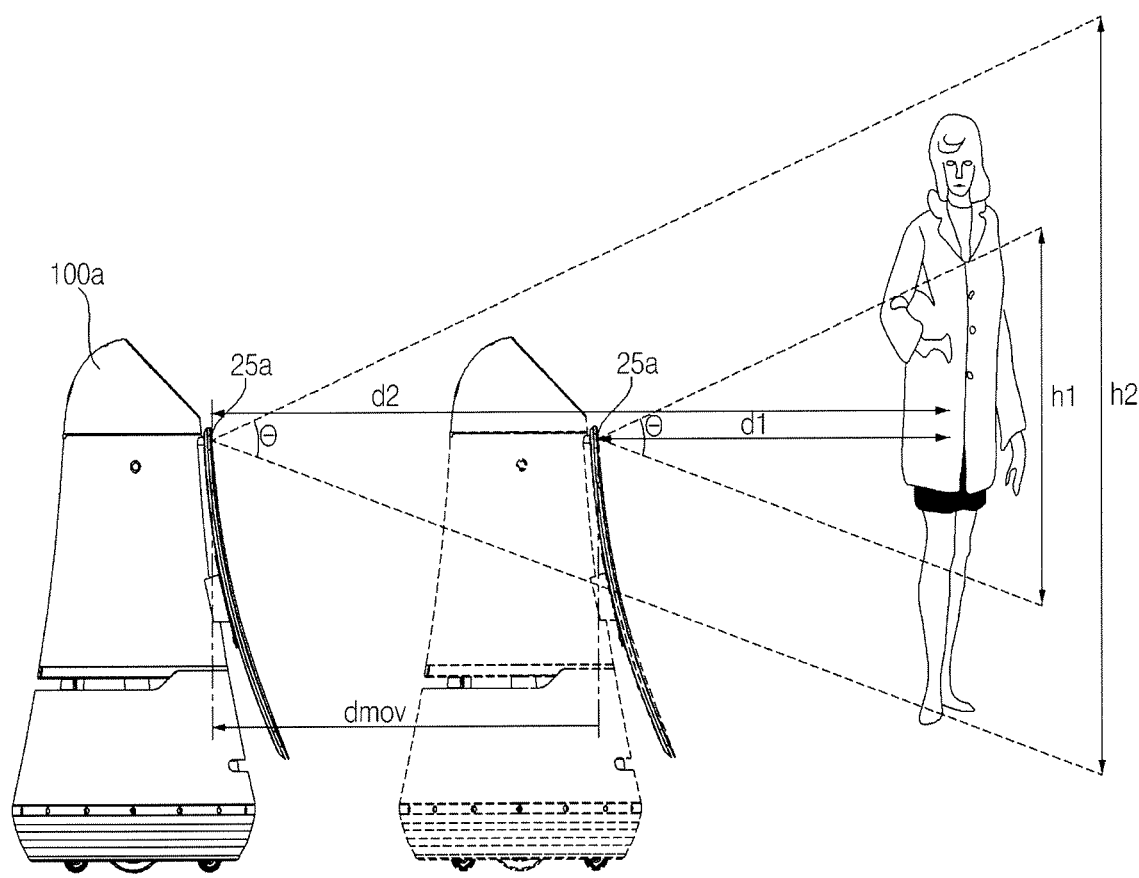
FIG. 11 is a view illustrating a virtual fitting service provided by the robot bottom perspective view of the mobile robot.

Meanwhile, as shown in FIG. 11, during the body scan (S920), the reference distance d between the mobile robot 100*a* and the user is set so that the scan may proceed in a state spaced apart from the reference distance d or more. For example, the reference distance d may be set to 1 m, but is not limited thereto.

When the initial distance between the mobile robot 100*a* and the user is d1, the scannable length (i.e., height) h1 of the user's body is determined by the angle of view θ of the camera 25*a* of the image acquisition unit 820.

In this case when the scannable length/height h1 does not meet a predetermined range of the entire body of the user, the controller 840 may control the driving unit 860 to widen the distance between the mobile robot 100*a* and the user.

In this case, the moving distance $d_{mov}$ may be set such that the total distance between the user and the mobile robot 100*a* is greater than or equal to the reference distance d.

The controller 840 determines the scannable length/height of the user by the camera 25*a* while driving forward or backward by controlling the driving unit 860 and calculates moving distance $d_{mov}$ to the current point, which is a point where the scannable length is greater than or equal to a predetermined range.

In this case, the controller 840 controls the driving unit 860 to perform forward or backward driving, and the mobile robot 100*a* proceeds forward or backward driving so as to be spaced apart from the user by the reference distance d and the scannable length can be measured. The controller 840 checks whether the predetermined range or more of the user's body is scannable through the image acquisition unit 820 at the reference distance d, and when the scan is processed less than the predetermined range of the user's body, the driving unit 860 may be controlled to further widen the distance between the user and the mobile robot 100*a* to be greater than the reference distance d.

The scannable length of the user by the camera 25*a* may be determined to calculate a moving distance $d_{mov}$ to a current point at which the scannable length is greater than or equal to a predetermined range.

The controller 840 receives information about the number of rotations of the wheels of the left and right wheels detected by the wheel sensor during the movement from the initial distance d1 to the current point, and calculates a movement distance $d_{mov}$ according to the number of rotations of the wheels.

Accordingly, at the current point, the controller 840 can calculate the moving distance $d_{mov}$ so that the user's scannable length h2 meets a predetermined range of the user's entire body, preferably 80% or more while the total distance d2 between the user and the mobile robot 100*a* satisfies the reference distance d or more.

In this case, the controller 840 generates a virtual avatar character of the user and provides a fitting service, and the controller 840 may determine the body size of the user, that is, the body shape information, according to a difference between the reference body size value set for the total distance d2 determined according to the moving distance $d_{mov}$ and the body size values in the scanned image.

In detail, the controller 840 may receive information about a reference body size for each part of the total distance d2 between the user and the mobile robot 100*a*.

FIG. 12 shows an example of a reference body size for each body part for various total distances.

As shown in FIG. 12, when the total distance is 1 m, the size for each part of the reference size of the human body viewed from the total distance may be included as data, and each data value is a two-dimensional value, not a three-dimensional value. It can be expressed as, for example, a value when the person is viewed from the front.

That is, the diameter of the head, the length of the shoulder, the diameter of the waist, and the height shown in the 2D image may be set as the reference values.

Such a reference body size may medium size, but alternatively it may be of the smallest size.

The controller 840 may read the reference body size according to the total distance d2 calculated by the moving distance $d_{mov}$, and calculate a difference from the actual size values of the user in the scanned image.

The controller 840 may determine the user's body information and specific body shape information according to the difference of each size value.

For example, when the total distance d2 is 1 m and is equal to the reference distance d, the actual size value of the user in the scanned image may be read for each part. For example, if the user's head diameter in the image is read as 11 cm, shoulder length 27 cm, waist diameter 16 cm, height 150 cm, the difference between the actual size of the user and the reference body size is calculated for each part.

According to FIG. 12, in the above example, each difference satisfies 2 to 3 cm, and body information of the user may be determined according to the range of each difference.

That is, when the reference body size indicates a medium size, and the size of the user in the scanned image is 2 to 3 cm smaller than the reference body size, the body shape information of the user may be determined to be thinner than usual.

In addition, the controller 840 may perform a detailed body type classification, such as a thin and large body shape or a thin and small body shape, according to the correlation of the size difference for each body part.

In FIG. 12, it is determined that the reference body size for each part according to the total distance is preset, but only the reference body size for each part for the reference distance d is preset, and the reference body size with respect to the total distance may be calculated in proportion to the total distance with respect to the reference distance.

The information about the reference body size may be recorded in the storage unit 830 or may be received from the server 10.

At this time, the mobile robot 100a senses the scannable length h1 at the initial distance d1 from the user, calculates the moving distance $d_{mov}$ so that the scannable length h1 satisfies the predetermined range or more, and the total distance d2 satisfies the reference distance d or more, and then the mobile robot 100a may request that the user keep away from the mobile robot 100a by the moving distance $d_{mov}$.

The user who uses the fitting service may move to a position distant from the mobile robot 100a by the movement distance $d_{mov}$ according to the guidance of the mobile robot 100a such that the body of the user can be accurately scanned.

More preferably, the controller 840 calculates the moving distance $d_{mov}$ such that the distance between the moving robot 100a and the user satisfies the total distance d2, and the controller 840 controls the moving robot 100a to move forward or backward by the corresponding moving distance $d_{mov}$. According to this embodiment, the mobile robot 100a automatically adjusts the distance to the user to the total distance without requesting that the user move.

Consequently, it is possible to scan the user's body more than a predetermined range while minimizing the user's movement to accurately determine the user's body information, to calculate the difference between the reference body size value for the total distance d2 and the user's body size value in the scanned image. Also, it is possible to determine the user's body information, that is, the body shape according to the difference, to generate an avatar reflecting the body shape, and to provide a virtual fitting service including various information using the corresponding avatar.

In some embodiments, a process of providing the body information identified as the result of body scanning to the user for confirmation may be performed. In this case, a menu allowing the user to manually correct at least some of the body information may be provided.

According to an embodiment of the present invention, the mobile robot 100a may receive at least one of new product information, popular product information, or event information from the server 10 through the communication unit 890, and may recommend a predetermined product to the user.

The user may confirm the recommended product displayed on the display unit 810, and may request a fitting service for the recommended product.

According to an embodiment of the present invention, the mobile robot 100a may identify a user.

For example, the mobile robot 100a may include a scanner for identifying a barcode, etc. The mobile robot may recognize a barcode or a QR code in a card presented by the user or on the screen of an electronic device presented by the user, and may compare recognized information with a pre-stored customer database in order to identify the user.

Alternatively, the mobile robot 100a may acquire a facial image of the user in front thereof through the image acquisition unit 820, and may compare data on the acquired facial image of the user with a pre-stored customer database in order to identify the user.

In this case, the mobile robot 100a may request information about the identified user from the server 10 through the communication unit 890.

In the case in which the mobile robot 100a includes no customer database because of a security policy, the amount of data, and system resources, the mobile robot 100a may transmit identification information based on the barcode or the QR code or the data on the acquired facial image of the user to the server 10, and may receive confirmed user information from the server 10.

Meanwhile, the server 10 may also transmit information about previous purchase particulars, preference product information, and information about fitting particulars of the identified user to the mobile robot 100a.

The mobile robot 100a may receive the information about previous purchase particulars or fitting particulars of the identified user from the server 10 through the communication unit 890, and may recommend a predetermined product based on the received previous purchase particulars or fitting particulars of the user.

Alternatively, the server 10 may identify the recommended product based on the information about previous purchase particulars or fitting particulars of the user, and may transmit information about the recommended product to the mobile robot 100a.

Meanwhile, according to this embodiment, user consent related to individual information may be requested before the provision of the virtual fitting service.

To this end, a description related to the virtual fitting service, the full text of precautions, and the full text related to consent to individual information collection/usage may be displayed on the display unit 810, and the service may be commenced after the user consents.

In addition, after user consent, information related to the user and the fitting may be used.

The mobile robot 100a may transmit the identified body information to the server 10. The server 10 may store and administrate the fitting particulars of the user.

In some embodiments, the mobile robot 100a may photograph the user, may transmit captured image data to the server 10, may identify the body information of the user based on image data received from the server 10, and may create an avatar character for the user.

In some embodiments, the mobile robot 100a may identify the user, may request information about the identified user from the server 10, and may receive the body information of the user from the server 10.

Consequently, the mobile robot 100a may create an avatar character synthetically using the body information based on the image data acquired through photographing/capturing and the body information received from the server 10.

Meanwhile, the virtual fitting user interface screen provided by the mobile robot 100a may further include a product option item capable of changing the option of the selected clothes. For example, the user may select the product option item in order to change the color or size of the clothes.

Meanwhile, the virtual fitting user interface screen provided by the mobile robot 100a overlays the selected clothes on the virtual avatar character and displays them to the user. Thereafter, an image of the user may be obtained, and the user's response, that is, the satisfaction, may be extracted from the image to recommend other clothes. Also, in the case in which a size corresponding to a recommended size based on the body information of the user is selected in the product option item, the user interface screen may further display information about the recommended size. Consequently, the user may know a size suitable for their body.

In addition, the user interface screen may further include a style menu item corresponding to a user interface screen capable of changing the size and color of the selected clothes composed with the avatar character and a fit menu item corresponding to a user interface screen indicating the extent to which the selected clothes are tight (i.e., fitted) with respect to the avatar character using a color while changing the size of the selected clothes composed with the avatar character.

Virtual fitting user interface screens according to embodiments of the present invention will be described below with reference to FIGS. 13 to 24.

FIGS. 13a to 24 are reference views illustrating virtual fitting services provided by the robot according to the embodiment of the present invention.

Figure 13A:
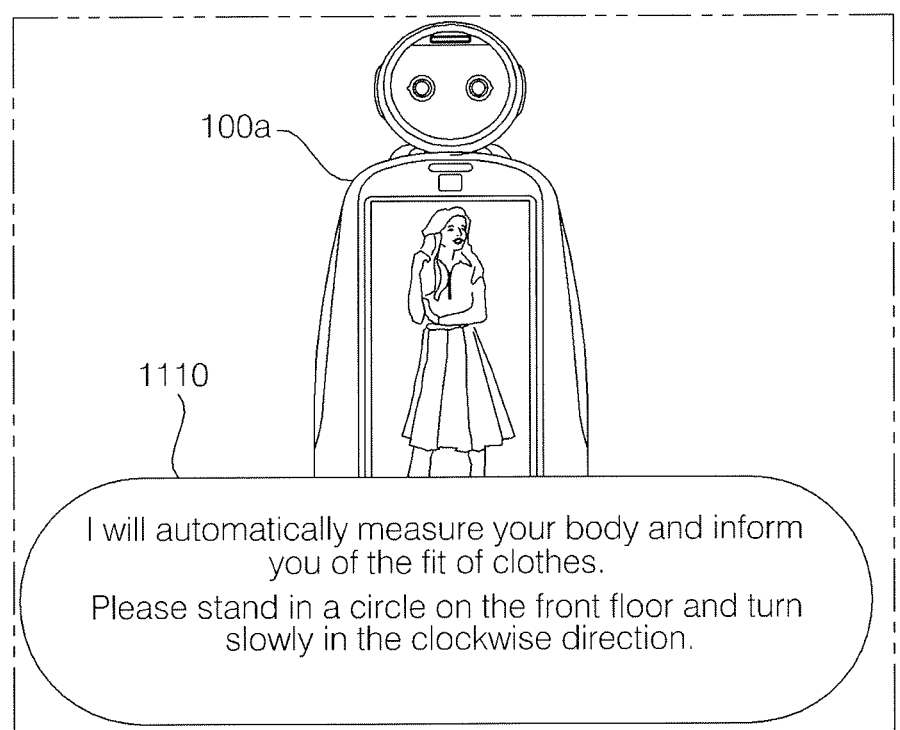
FIGS. 13A and 13B are views illustrating the mobile robot outputting a speed guide according to an embodiment of the present application.
Figure 13B:
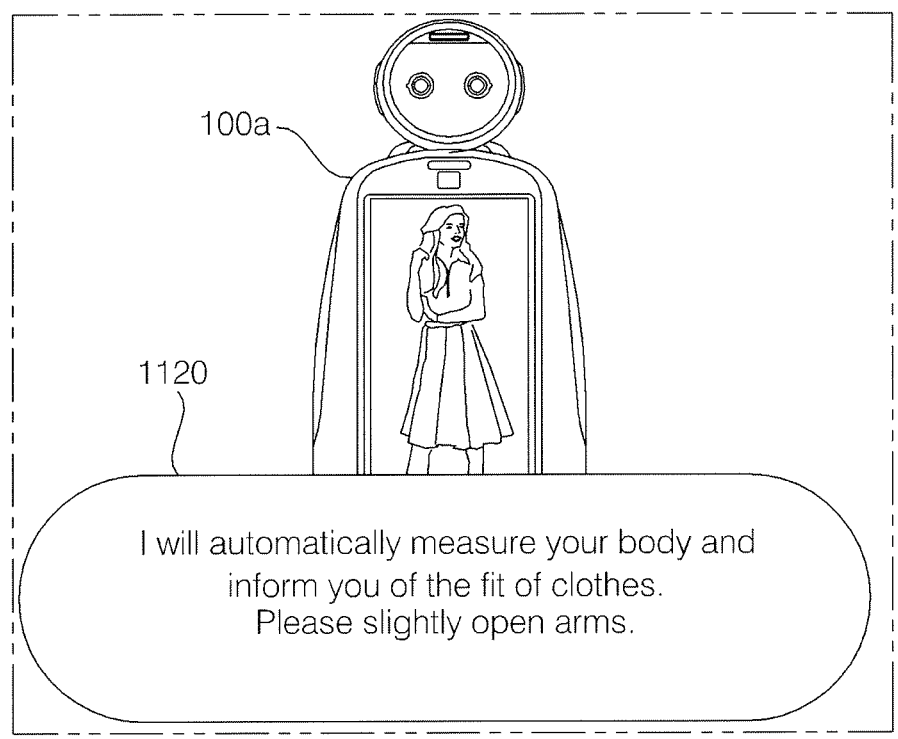

Referring to FIGS. 13a and 13b, the mobile robot 100a may be disposed in a clothing store in order to inform of clothes and events.

Meanwhile, the mobile robot 100a may display product information, event information, or other standby screens on the display unit 810, or may output the product information, event information, etc. through the sound output unit 880 in the form of sound, while on standby.

In addition, the mobile robot 100a may provide various kinds of services, such as a fitting service, gathering visitors, product guidance, purchase inducement, and coordinator proposal, and may be on standby at a specific place in a store or autonomously travel about the store in order to induce the use of a service.

The mobile robot 100a may recognize a customer who enters a clothing store or a customer who approaches the mobile robot 100a through the image acquisition unit 820 and the sensor unit 870, and may positively induce the customer to visit the store, to use a service, and to purchase clothes through experience of a virtual fitting service while issuing a greeting.

Referring to FIG. 13a, the mobile robot 100a may output a speech guide message 1110 inducing a fitting service experience through the sound output unit 880. In addition, the speech guide message 1110 persuading the fitting service experience may include a request for a customer action necessary to use a fitting service, such as "I will automatically measure your body and inform you of the fit of clothes. Please stand in a circle on the front floor and turn slowly in the clockwise direction."

According to an embodiment of the present invention, since, in the case in which the user turns 360 degrees in a clothing store in which other people are present, the user may feel reluctance and inconvenience, the mobile robot 100a may photograph the user while moving without requesting the user to turn. In this case, the details of a speech guide message may be changed.

Referring to FIG. 13b, the mobile robot 100a may output a speech guide message 1120, such as "I will automatically measure your body and inform you of the fit of clothes. Please slightly open your arms," through the sound output unit 880.

When the customer requests a fitting service, the mobile robot 100a may scan the body of the customer, and may then virtually fit clothes that the customer is concerned about (i.e., has an interest in) or is a current bestseller product.

When the customer requests the fitting service, the body information of the customer may be identified, the avatar character may be created, and the virtual fitting user interface screen may be displayed on the display unit 810 through the processes described with reference to FIGS. 9 and 10.

Figure 14A:
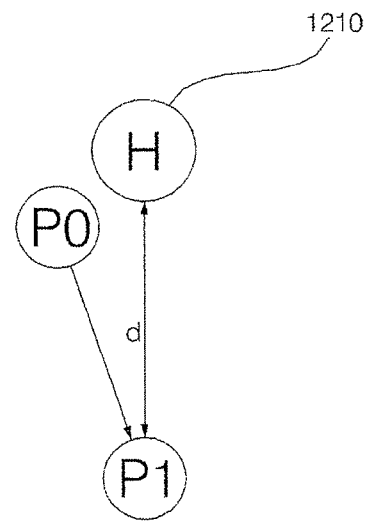
FIGS. 14A-14C are views illustrating the mobile robot moving to various positions with respect to the customer according to an embodiment of the present application.
Figure 14B:
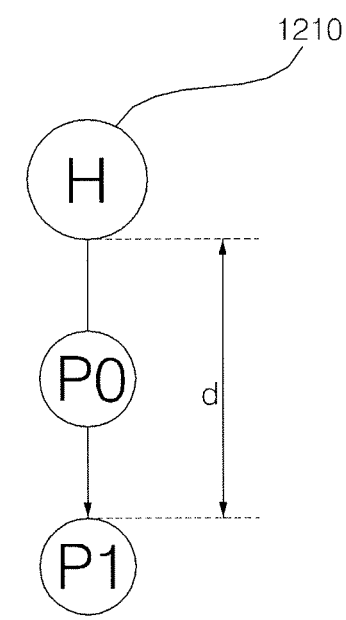

Referring to FIG. 14a and FIG. 14b, the mobile robot 100a according to the embodiment of the present invention may move from a zero position P0 to a first position P1, at which the image acquisition unit 820 is capable of acquiring image data including a specific body part set in the fitting service, i.e., image data necessary for body scanning, and may then start body scanning under the control of the controller 840.

For example, when the mobile robot 100a is located at a zero position P0, which is too close to a customer 1210 who is located at a predetermined position H, the body of the user may not be sufficiently photographed depending on the angle of view of the camera 313, the performance of the camera 313, and the distance and angle between the camera 313 and the customer 1210.

In this case, the controller 840 may control the driving unit 860 such that the mobile robot 100a moves to the first position P1, at which the image acquisition unit 820 is capable of acquiring image data necessary for body scanning.

After movement, the controller 840 may perform control such that the image acquisition unit 820 photographs the user in order to scan the body of the user.

In some embodiments, the distance that is optimal to acquire image data necessary for body scanning may be set to a reference distance d. For example, in the case in which the reference distance d is set to 1 m, when the mobile robot 100*a* is located at the zero position P0, which is closer to the reference distance d of 1 m, the mobile robot 100*a* may move to the zero position P0.

In this case, the controller 840 may control the driving unit 860 to move the mobile robot 100*a* such that the distance between the mobile robot 100*a* and the user becomes the predetermined reference distance d or more such that the predetermined range or more of the entire body of the user is included in the angle of view of the camera included in the image acquisition unit 820.

Preferably, the controller 840 moves the mobile robot 100*a* such that the distance between the mobile robot 100*a* and the user becomes the predetermined reference distanced and such that the user is located in front of the mobile robot 100*a*.

Preferably, as illustrated in FIG. 14*a*, the controller 840 may control the mobile robot 100*a* so that the distance between the mobile robot 100*a* and the user becomes the predetermined reference distance d or more, and a predetermined range or more of the entire body of the user may be present in the angle of view of the camera 313. In addition, the controller 840 may control the mobile robot 100*a* to perform a linear movement and a rotational movement of the mobile robot 100*a* so that the user is in front of the mobile robot 100*a*.

Meanwhile, when the mobile robot 100*a* is located in front of the user as shown in FIG. 14*b*, the controller 840 may vary the distance from the user to the preset reference distance d or more only by linear movement.

By such movement, more than a predetermined range of the entire body of the user may be included in the angle of view of the camera.

According to this embodiment, the mobile robot 100*a* automatically adjusts the distance to the user to reference distance d or more without requesting that the user move, and moves such that the user is located within the angle of view of the camera.

Consequently, it is possible to accurately identify the body information of the user while minimizing the movement of the user and to create an avatar.

Figure 14C:
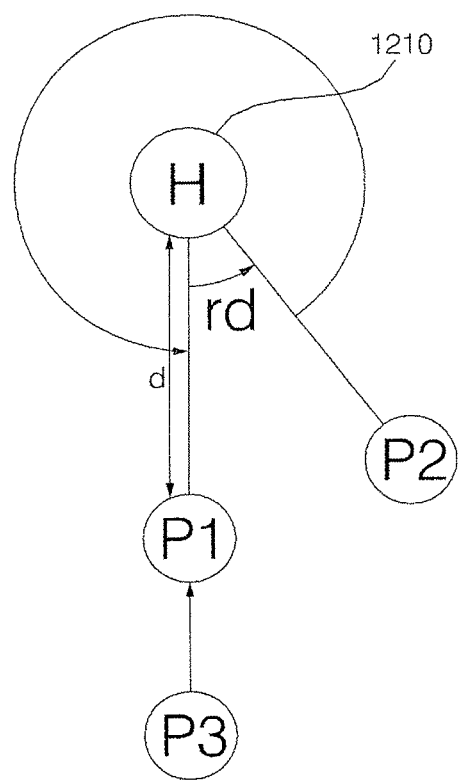

Referring to FIG. 14*c*, the mobile robot 100*a* according to the embodiment of the present invention may photograph a customer 1210 located at a predetermined position H in the first direction through the image acquisition unit 820 at a first position P1.

In addition, the mobile robot 100*a* may move around the customer 1210 by a predetermined angle rd, and may then photograph the customer 1210 in a second direction different from the first direction through the image acquisition unit 820 at a second position P2.

In some embodiments, the mobile robot 100*a* may photograph the customer 1210 even during rotation in order to acquire images of the body of the customer at various angles.

The controller 840 may extract information about body parts of the user, such as the height, arm length, leg length, and positions of joints of the user, from the images of the body of the customer.

Consequently, it is possible to more accurately scan the body using the images captured at various angles without inconvenient turning of the customer.

As described above, the body scan of the user may be performed at various angles and collected to analyze the user's body information, specifically, the user's body shape. In this case, the controller 840 may analyze the body shape of the user by comparing the reference body size according to the total distance d2 between the user and the mobile robot 100*a* of FIG. 12 and the body size of the user in the scanned image.

In some embodiments, the reference distance d between the mobile robot 100*a* and the customer 1210 may be set. For example, in the case in which the reference distance is set to 1 m, the mobile robot 100*a* may photograph the user at a position distant from the user by the reference distance, 1 m. In some embodiments, a proportional expression may be applied to a reference body dimension value set with respect to the reference distance, 1 m, and body dimension values in an image in order to identify the body information, specifically the body shape information of the user.

In this case, the controller 840 may perform control such that the mobile robot 100*a* moves forwards or backwards, whereby the distance between the mobile robot 100*a* and the user becomes the predetermined reference distance d.

For example, in the case in which the mobile robot 100*a* is located at a third position P3, which is farther than the reference distance, the mobile robot 100*a* may move forwards to the first position P1.

According to this embodiment, the mobile robot 100*a* automatically adjusts the distance to the user to the reference distance without requesting the user to move.

Consequently, it is possible to accurately identify the body information of the user while minimizing the movement of the user and to create an avatar.

Figure 15:
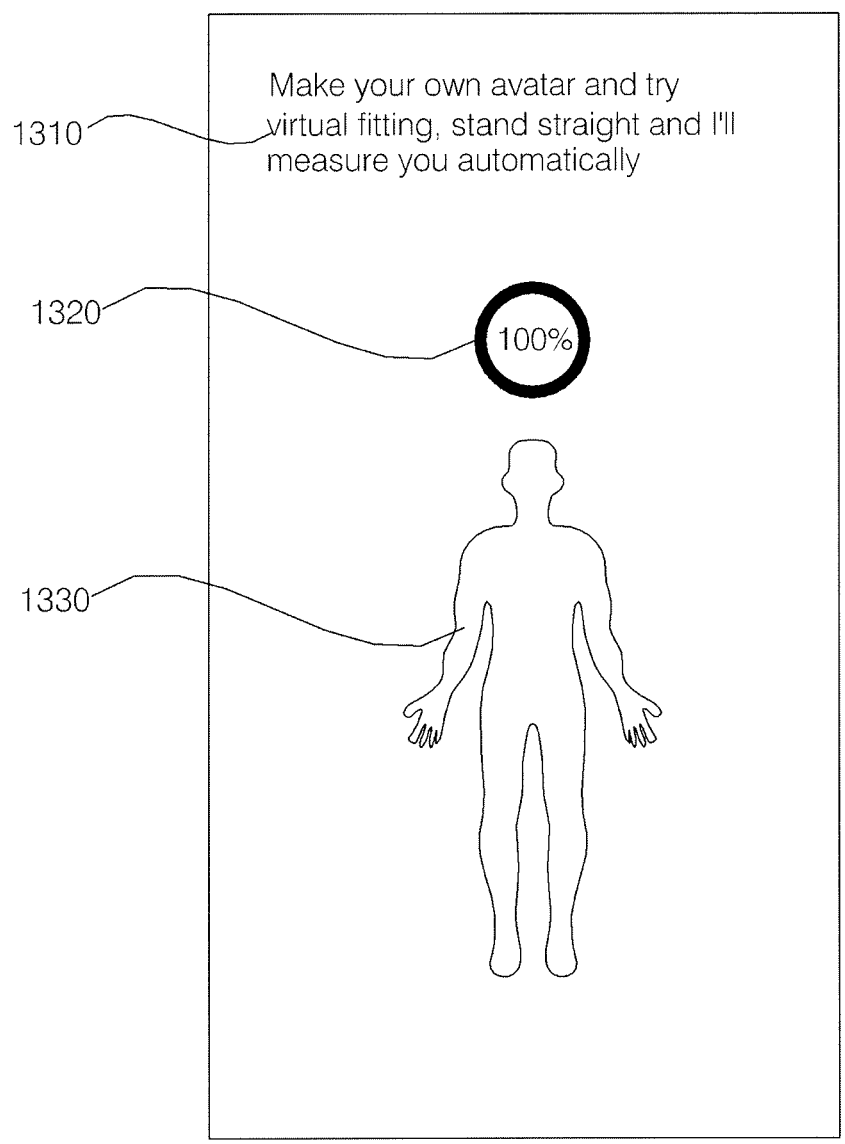
FIG. 15 is a view illustrating an example of a user interface screen display during body scanning according to an embodiment of the present application.

FIG. 15 shows an example of a user interface screen display at the time of body scanning.

Referring to FIG. 15, a guide sentence 1310 for body scanning and test 1320 and a graphical image 1330 indicating scanning progress, may be displayed on the display unit 810. The guide sentence may include "Make your own avatar and try virtual fitting, stand straight and I'll measure you automatically." Consequently, it is possible for the user to intuitively know the level of scanning.

Meanwhile, when scanning and avatar creation are completed, the mobile robot 100*a* may inform of the completion of scanning and avatar creation.

For example, the mobile robot 100*a* may output a guide sentence, such as "Avatar creation is completed. Please select clothes using a style menu and confirm the fit and match of the clothes using a fit menu," in the form of an image and/or sound in order to inform of avatar creation and to guide control after the avatar creation.

Figure 16:
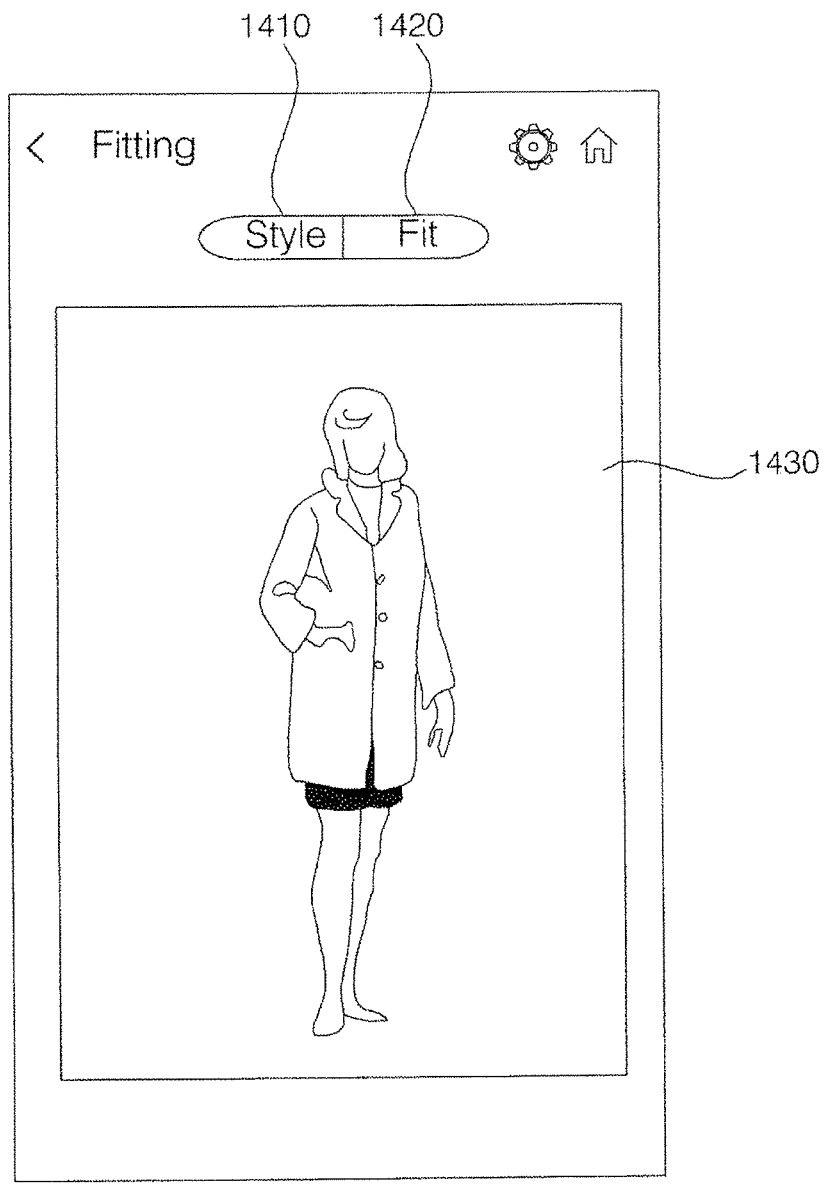
FIG. 16 is a view illustrating a style menu item according to an embodiment of the present application.

Referring to FIG. 16, the display unit 810 may include a style menu item 1410 capable of confirming a virtual fitting screen on which clothes are changed or the avatar wears the selected clothes and a fit menu item 1420 capable of confirming the fit of the selected clothes, such as tightness or looseness of the clothes.

The customer may select clothes in a main area 1430, and may select the style menu item 1410 and the fit menu item 1420 in order to confirm a virtual fitting user interface screen corresponding to the selected item.

The controller 840 may perform control such that a virtual fitting user interface screen including a virtual fitting image is displayed on the display unit 810. The virtual fitting user interface screen may provide virtual fitting including a composite image in which the avatar wears the selected clothes such that the customer can see the fit, appearance, material, and other qualities of the selected clothes when wearing the clothes.

Figure 17:
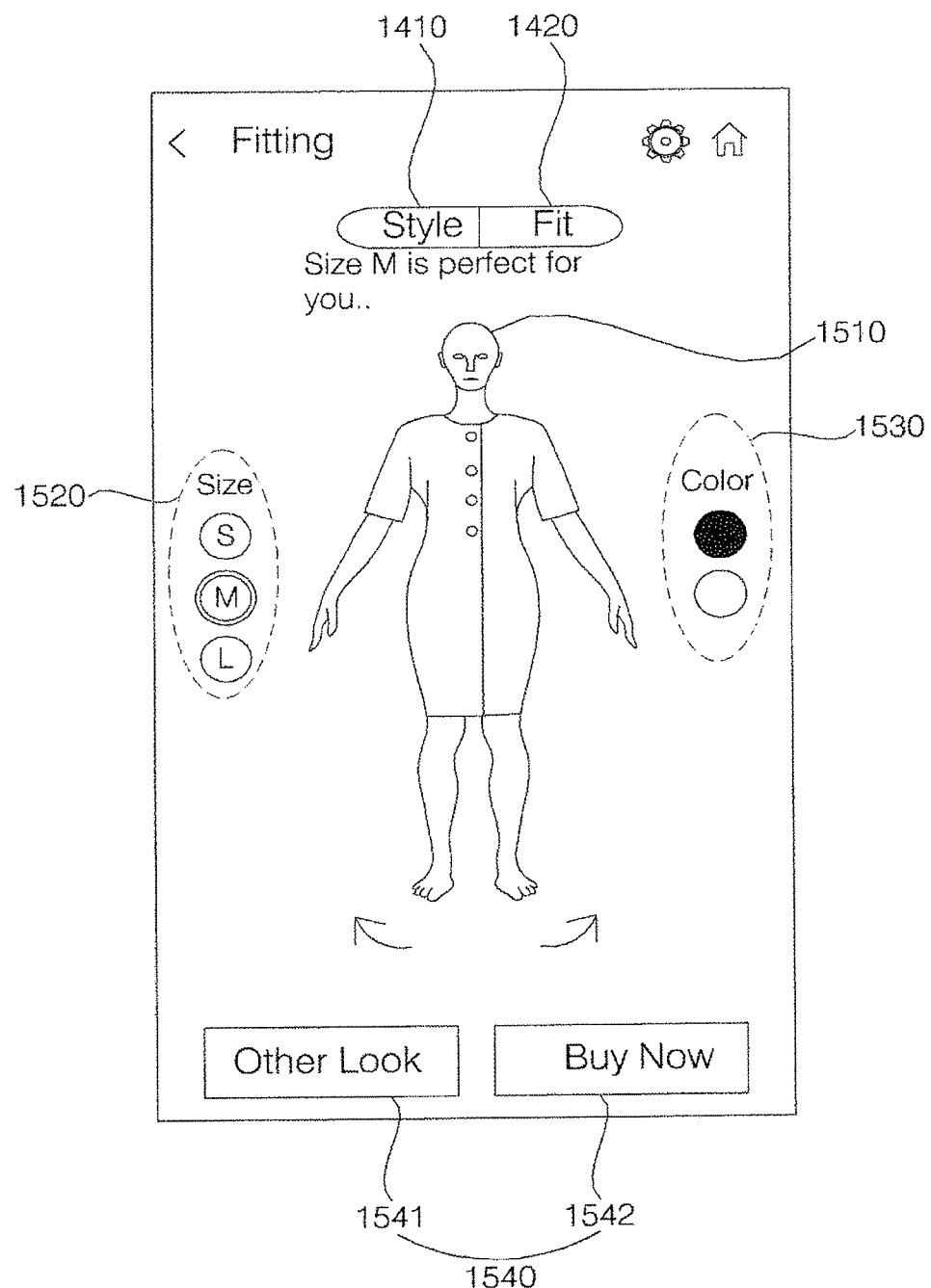
FIG. 17 is a view illustrating a virtual fitting user interface according to an embodiment of the present application.

FIG. 17 shows a virtual fitting user interface screen displayed according to the selection of the style menu item 1410.

Referring to FIG. 17, the virtual fitting user interface screen may include a style menu item 1410 capable of converting a user interface screen, a fit menu item 1420, and a composite image 1510 in which the avatar wears the selected clothes.

In addition, the virtual fitting user interface screen may further include product option items 1520 and 1530 capable of changing the option of the selected clothes. For example, the product option items 1520 and 1530 may include at least one of a size option item 1520 capable of changing the size of the clothes or a color option item 1530 capable of changing the color of the clothes.

Meanwhile, the virtual fitting user interface screen may further include another menu item 1540. For example, the menu item 1540 included in the virtual fitting user interface screen may include another menu item 1541 capable of changing clothes to be virtually fit, and a purchase menu item 1542 capable of purchasing the currently selected clothes.

Meanwhile, clothes may be selected first and then the use of the virtual fitting service may be selected, although an embodiment in which the use of the virtual fitting service is selected first and then clothes are selected has been described with reference to FIGS. 13a to 17.

For example, the display unit 810 of the mobile robot 100a may display a predetermined product or product list on a standby screen.

When the customer selects one or more clothes by touch or speed input, the controller 840 may perform control such that a guide message for a virtual fitting service and a menu item capable of being started are displayed on the display unit 810.

In addition, the controller 840 may provide a virtual fitting service guide image through the display unit 810.

When the customer requests a virtual fitting service, the mobile robot 100a may scan the body of the customer, may create an avatar, and may provide a virtual fitting image.

Meanwhile, while the display unit 810 of the mobile robot 100a provides a virtual fitting user interface screen, the user's response from the image of the user can be detected from the image acquisition unit 820 to recommend other clothes.

Figure 18:
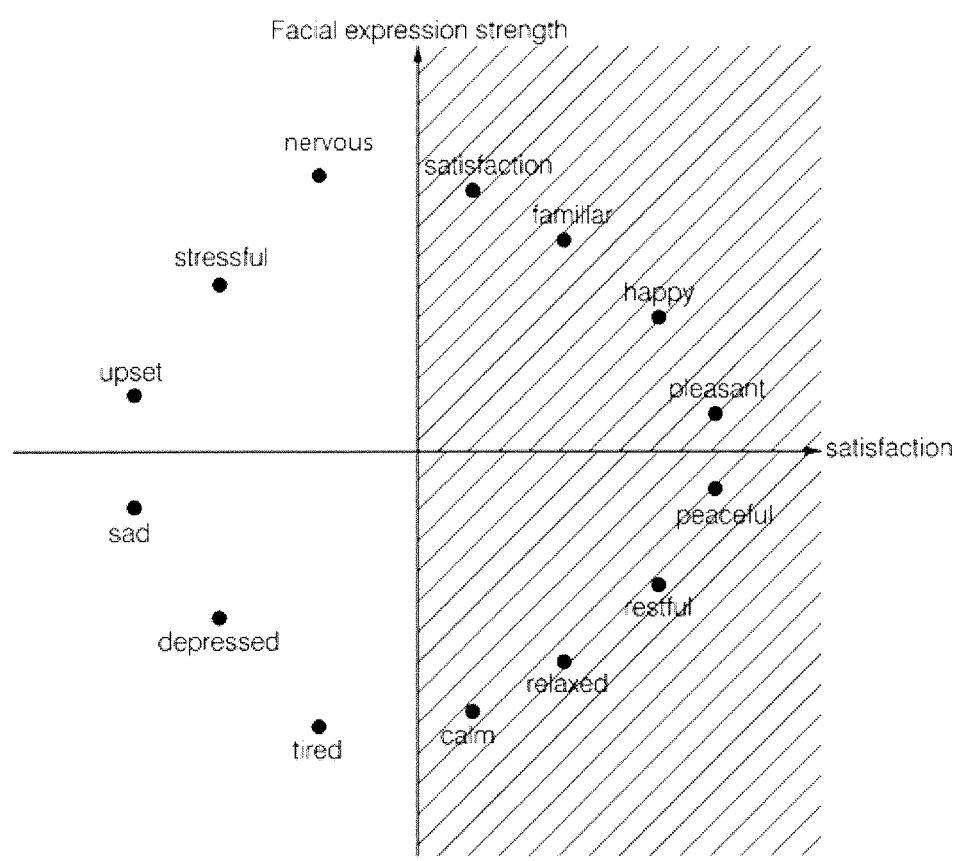
FIG. 18 is a graph illustrating a user satisfaction according to a human emotional state according to an embodiment of the present application.
Figure 19:
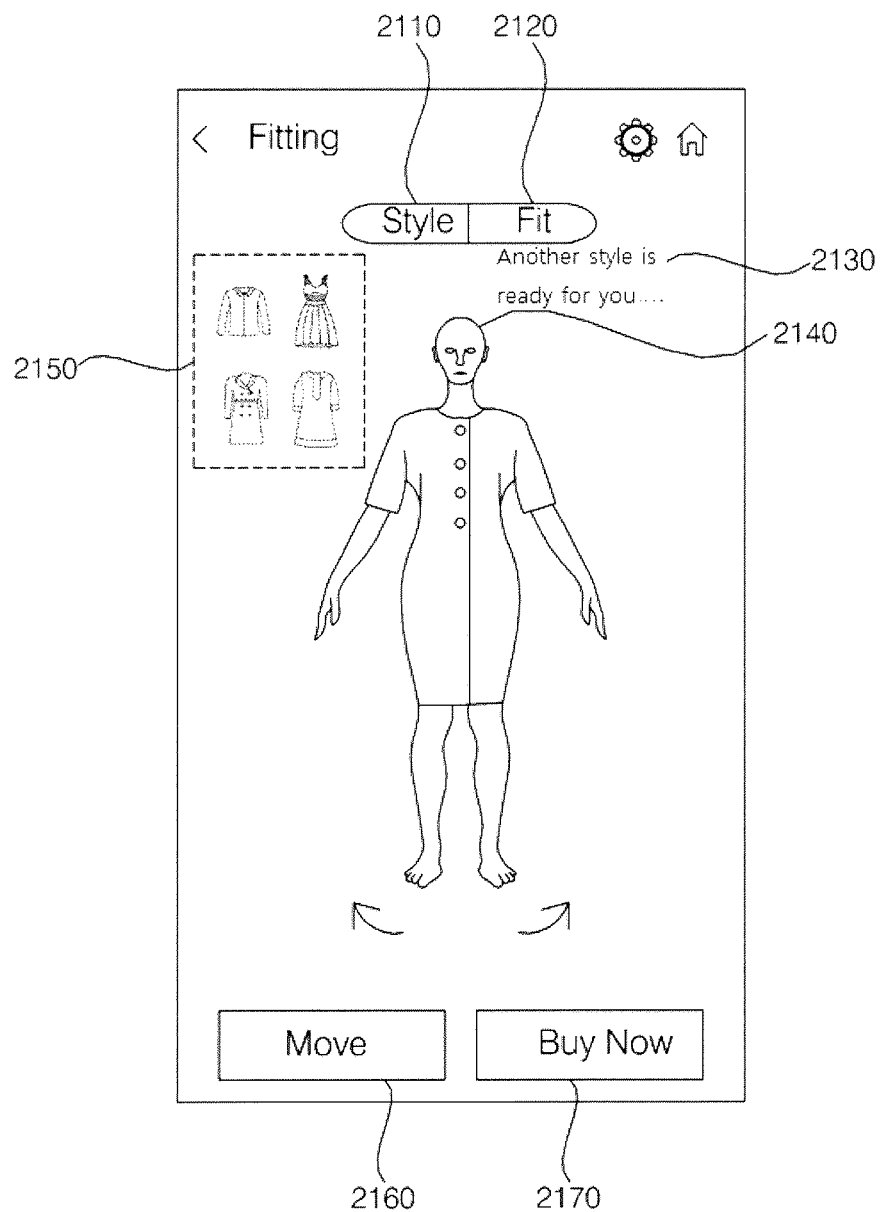
FIG. 19 is a view illustrating a screen for determining a user's satisfaction and recommending clothes according to an embodiment of the present application.

FIG. 18 illustrates a user's satisfaction according to a human emotional state, and FIG. 19 illustrates a screen for determining a user's satisfaction and recommending different clothes according to a determination result.

Referring to FIG. 18, the human emotional state may be classified into various forms, and standards thereof are presented in various methods. The mobile robot 100a may store data about a feature point of a human facial expression corresponding to a segmented emotional state or receive it from the server 10.

The controller 840 may obtain the facial expression information of the user from the image of photographing the user's response while the virtual fitting user interface screen is provided.

The controller 840 may extract a feature point from the acquired facial expression information of the user, and define an emotional state corresponding to the feature point.

Therefore, the controller 840 may obtain the user's response to the provided fitting image from the facial expression information of the user.

As shown in FIG. 18, a case of expressing satisfaction with the fitting image may be classified in advance with respect to various human emotional states, and only the emotional state displayed on the right half of the graph (indicated by contrast, i.e., inclined lines) can be interpreted as showing a positive response to the provided fitting image.

If it is determined that the user is dissatisfied with the facial expression information, the mobile robot 100a may display an item 2150 recommending clothes of different styles to the user as shown in FIG. 19. The screen of FIG. 19 is a screen for providing an item 2150 of a candidate group including clothes of different styles because the user is determined to be dissatisfied with the fitting image for clothes currently displayed, and brief sentence 2130 about this can be provided.

In this case, the display unit 810 may provide an item 2150 including a candidate group including clothes of a plurality of different styles to the virtual fitting user interface screen, and move item 2160 to another candidate group and the purchase item 2170 may be displayed together. According to the user's selection, one of the candidate groups of clothes is selected, and the fitting image may be provided again by overlaying the corresponding clothes on the virtual avatar 2140.

Figure 20:
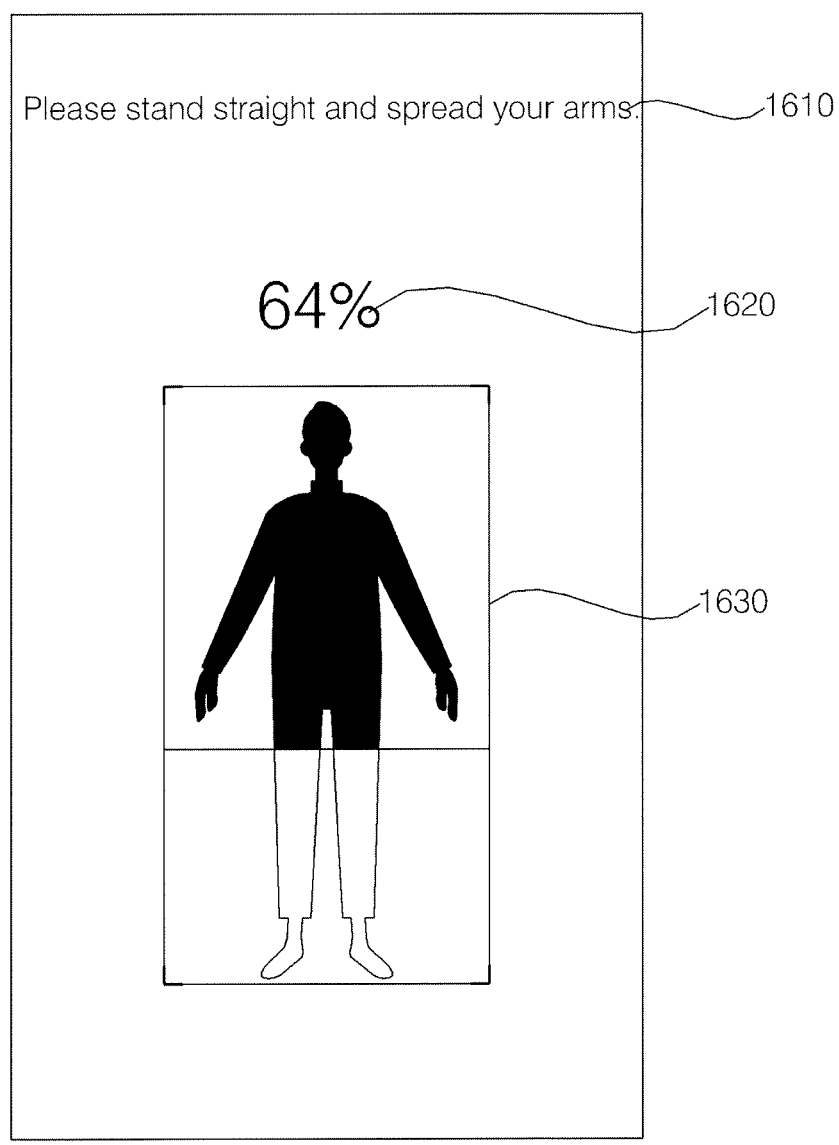
FIG. 20 is a view illustrating a user interface screen displayed during body scanning according to an embodiment of the present application.

FIG. 20 exemplarily shows an example of a user interface screen displayed at the time of body scanning.

Referring to FIG. 20, a guide sentence 1610 for body scanning, scanning progress information 1620, and a scanning image 1630 may be displayed on the display unit 810. Consequently, it is possible for the user to intuitively know the level of scanning.

Referring to FIG. 20, the guide sentence 1610, such as "Please stand straight and spread your arms," may be provided in order to inform of the action of the customer necessary during scanning.

In addition, the scanning progress information 1620 may provide scanning progress using percentage ranging from 0 to 100%. When the scanning progress is completed to 100%, switching to a virtual fitting user interface screen including a virtual fitting image may be performed.

For example, when scanning is completed, switching to a virtual fitting user interface screen corresponding to the style menu item 1410 may be performed.

In addition, the scanning image 1630, which is a scanning guide image, may express the action of the customer necessary during scanning using a graphical image.

In addition, the color of areas of the scanning image 1630 may be gradually changed according to the scanning progress in order to intuitively show the scanning progress.

In some embodiments, the scanning image 1630 may be created based on body type information of the customer.

The user interface screen according to the embodiment of the present invention may further include a style menu item 1741 corresponding to a user interface screen capable of changing the size and color of the selected clothes composed with the avatar character and a fit menu item 1742 capable of changing the size of the selected clothes composed with the avatar character and corresponding to a user interface screen indicating the extent to which the selected clothes are tight with respect to the avatar character using a color.

Figure 21:
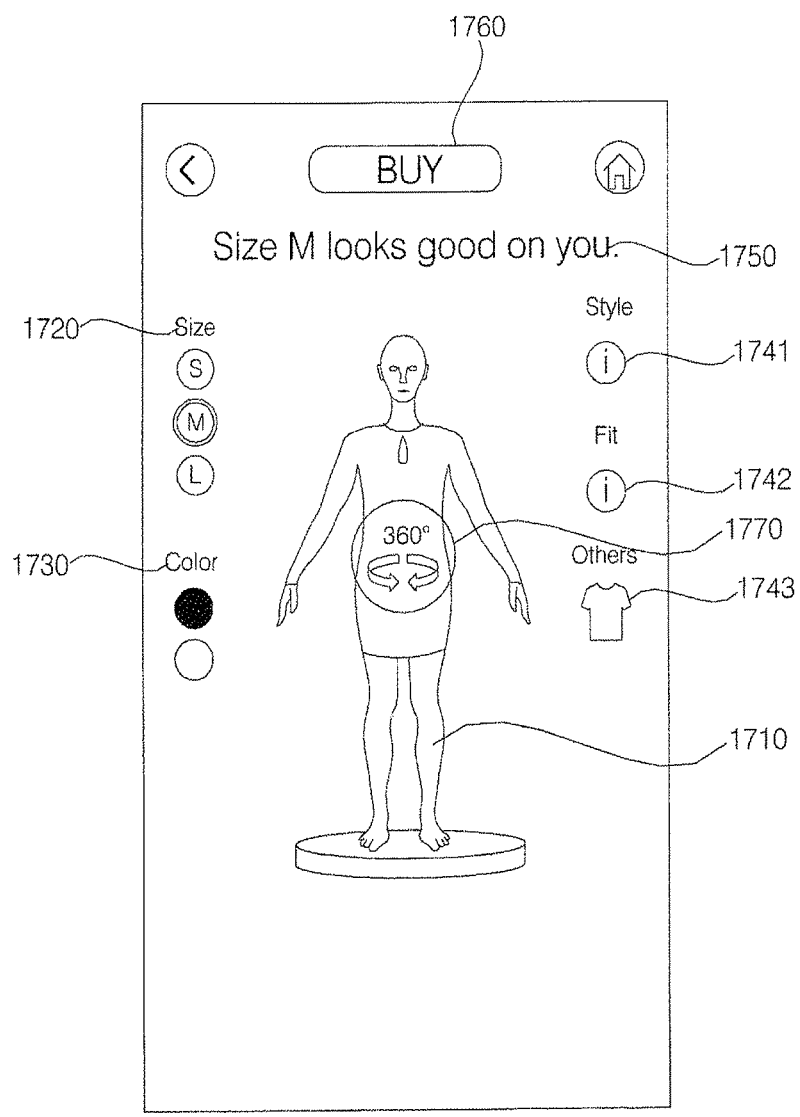
FIG. 21 is a view illustrating a virtual fitting user interface screen according to an embodiment of the present application.
Figure 22:
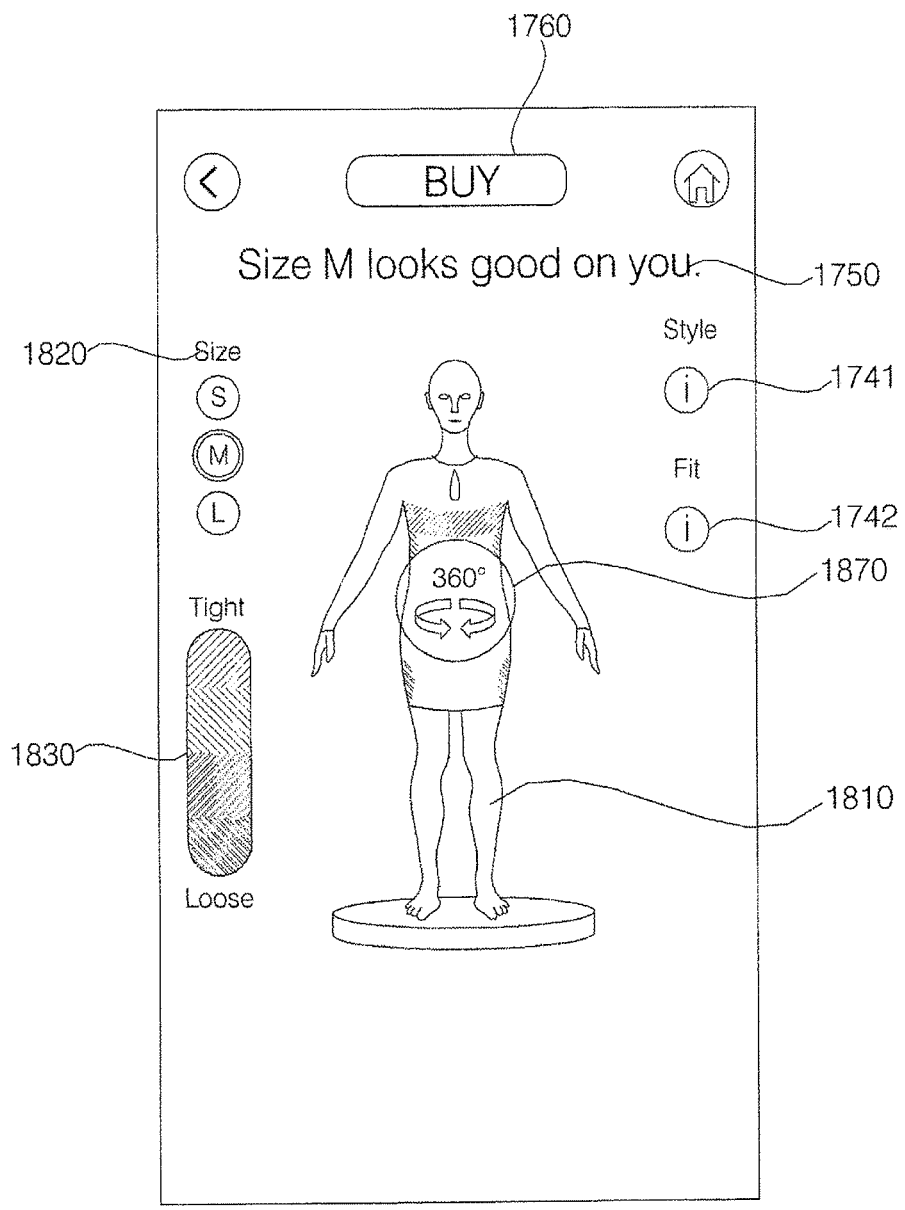
FIG. 22 is a view illustrating a virtual fitting user interface screen according to an embodiment of the present application.

FIG. 21 exemplarily shows a virtual fitting user interface screen displayed according to the selection of the style menu item 1741, and FIG. 22 exemplarily shows a virtual fitting user interface screen displayed according to the selection of the fit menu item 1742.

Referring to FIGS. 21 and 22, the virtual fitting user interface screen may include a style menu item 1741 and a fit menu item 1742, and screen switching may be performed according to a selected menu item. In addition, a currently selected one of the style menu item 1741 and the fit menu item 1742 may be highlighted.

Meanwhile, as shown in FIG. 21, a user interface screen corresponding to the style menu item 1741 may be display first as a default screen, and, when the fit menu item 1742 is selected, as shown in FIG. 22, switching to a user interface screen corresponding to the fit menu item 1742 may be performed.

Referring to FIG. 21, the user interface screen corresponding to the style menu item 1741 may include an avatar composite image in which an avatar 1710 having the body type of the user reflected therein wears selected clothes.

Here, the color and size selected by the user may be reflected in the clothes that the avatar 1710 wears.

Referring to FIG. 21, the user interface screen corresponding to the style menu item 1741 may further include product option items 1720 and 1730 capable of changing the option of the selected clothes. For example, product option items 1720 and 1730 may include at least one of a size option item 1720 capable of changing the size of the clothes and a color option item 1730 capable of changing the color of the clothes.

Consequently, it is possible for the user to confirm a virtual fitting image while conveniently changing the color and the size of the clothes.

In addition, the user interface screen corresponding to the style menu item 1741 may further include another menu item 1743 capable of changing clothes to be virtually fit. When the other menu item 1743 is selected, switching to a screen capable of selecting clothes may be performed.

Referring to FIG. 22, the virtual fitting user interface screen corresponding to the fit menu item 1742 may include an avatar composite image in which an avatar 1810 having the body type of the user reflected therein wears selected clothes.

Here, the size selected by the user may be reflected in the clothes that the avatar 1810 wears.

Referring to FIG. 22, the virtual fitting user interface screen corresponding to the fit menu item 1742 may further include a size option item 1820 capable of changing the size of the selected clothes.

Referring to FIG. 22, the fit of the selected clothes that the avatar 1810 wears, such as tightness or looseness, is displayed using a color in the user interface screen corresponding to the fit menu item 1742.

In this case, the user interface screen corresponding to the fit menu item 1742 may further include information 1830 about a color indicating tightness or looseness.

Consequently, it is possible for the user to intuitively know tightness or looseness and to easily know tightness or looseness for each body part.

Referring to FIGS. 21 and 22, the virtual fitting user interface screen may include a text area 1750, and various guide sentences may be provided in the text area 1750.

For example, in the case in which a size corresponding to a recommended size based on the body information of the user is selected in the product option item 1720, information about the recommended size may be displayed in the text area 1750. Consequently, the user may know a size suitable for their body.

Referring to FIGS. 21 and 22, the virtual fitting user interface screen may further include 360-degree rotating objects 1770 and 1870 displayed for a predetermined time at the time of entering the screen.

The user may manipulate the 360-degree rotating objects 1770 and 1870 in order to rotate the avatars 1710 and 1810.

Referring to FIGS. 21 and 22, the virtual fitting user interface screen may include a back button capable of returning to a previous screen and a home button capable of moving to a predetermined home screen.

In addition, the virtual fitting user interface screen may include a purchase button 1760 capable of moving (i.e., activating or executing) a purchase screen when being selected.

Figure 23:
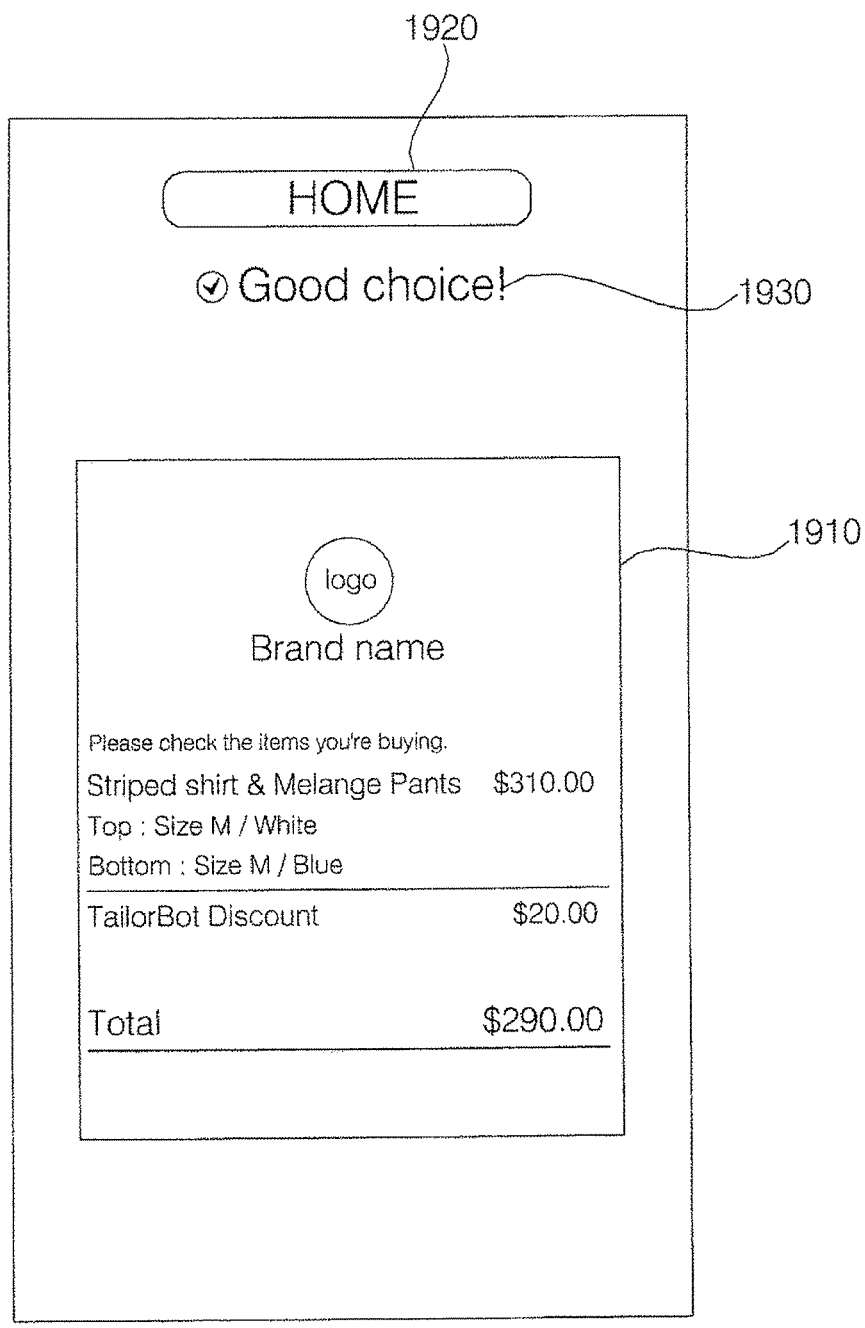
FIG. 23 is a view illustrating a purchase screen displayed when a purchase button is selected and payment is completed according to an embodiment of the present application.

FIG. 23 shows an example of a purchase screen displayed when the purchase button 1760 is selected and payment is completed.

Referring to FIG. 23, the purchase screen may include a purchase particulars area 1910, in which purchase particulars, brand information, and payment information are displayed, a text area 1930, in which text information about the completion of payment is displayed, and a home button 1920 capable of moving to a home screen.

Information about a purchased product and the payment information may be provided in the purchase particulars area 1910.

The brand information and the payment information may be sequentially provided in the purchase particulars area 1910.

The brand information, such as brand logo and brand name, and the payment information, such as order number, product name, product information (size/color), discounted price, and the final amount of payment, may be displayed in the purchase particulars area 1910.

Upon completing payment, the customer may move to a counter, and may receive the clothes.

Alternatively, in another embodiment, the customer may consent to purchase the selected clothes, may move to a counter, may pay, and may receive the clothes.

Figure 24:
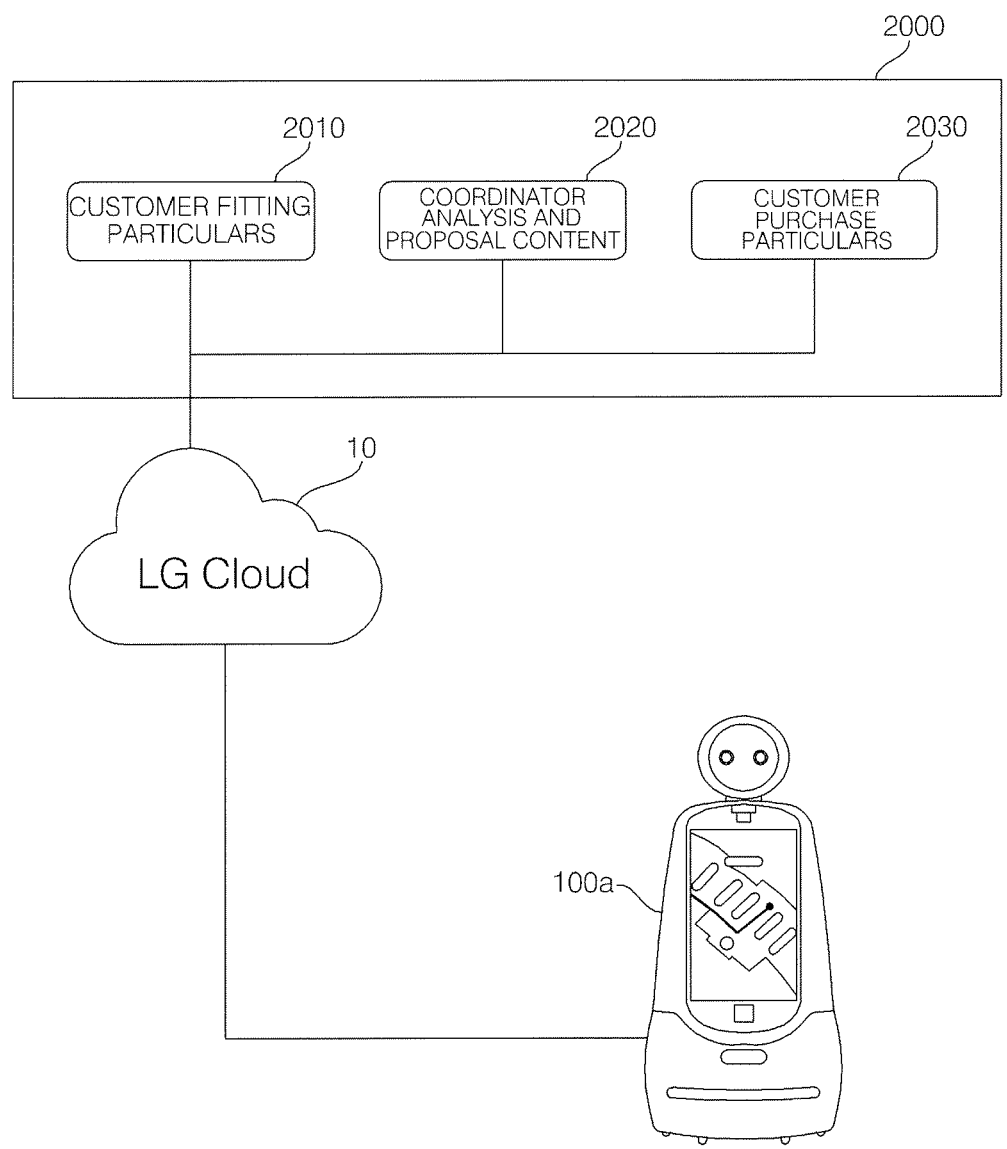
FIG. 24 is a view illustrating the storing and administration of data related to functions that can be provided by the robot to a server according to an embodiment of the present application.

Referring to FIG. 24, in the case in which the mobile robot 100a is used in a clothing store or a department store, the administrator may store and administrate data 2000 related to functions that can be provided by the mobile robot 100a in the clothing store or the department store in the server 10. For example, the administrator may store and administrate customer fitting particulars 2010, coordinator analysis and proposal content 2020, and customer purchase particulars 2030.

The server 10 may train and analyze the data stored therein.

For example, the server 10 may count the number of fitting services, and may provide a report analyzing data on interaction with the customer to the administrator.

Consequently, a store manager may confirm the products that the customer has worn and the products that the customer has purchased for reference in the next promotion event.

Meanwhile, the mobile robot 100a may download the customer fitting particulars 2010, the coordinator analysis and proposal content 2020, and the customer purchase particulars 2030 from the server 10.

In addition, the mobile robot 100a may download a list of new products and popular products, information about product particulars, event information, and promotion information.

Meanwhile, the mobile robot 100a may utilize the downloaded information for a guide service and a fitting service.

The robot according to the present invention, the robot system including the same, and the method of controlling the robot and the robot system are not limitedly applied to the constructions and methods of the embodiments as previously described; rather, all or some of the embodiments may be selectively combined to achieve various modifications.

Meanwhile, the method of controlling the robot according to the embodiment of the present invention and the robot system including the same may be implemented as code that can be written on a processor-readable recording medium and thus read by a processor. The processor-readable recording medium may be any type of recording device in which data is stored in a processor-readable manner. The processor-readable recording medium may include, for example, read only memory (ROM), random access memory (RAM), compact disc read only memory (CD-ROM), magnetic tape, a floppy disk, and an optical data storage device, and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

The invention claimed is:

1. A method of controlling a robot, the robot including a main body, a camera and a display, the method comprising:
    receiving a user input at the robot, the user input including a request for a fitting service;
    moving the robot to a first position located at a predetermined reference distance from the user, wherein in the first position, a predetermined range or more of a body of the user is scannable by the camera of the robot;
    scanning, at the first position, the predetermined range or more of the body of the user by the camera; and
    providing the fitting service by:
        creating a virtual avatar character of the user based on a result of the scanning; and
        displaying the virtual avatar character on the display,
    wherein the fitting service is provided to the virtual avatar character by determining body shape information of the user by comparing the result of the scanning with a reference body size for the predetermined reference distance from the user.

2. The method according to claim 1, wherein the robot includes a wheel for moving the main body, and
    wherein the scanning includes:
        calculating a distance that the robot moves by measuring a rotational speed of the wheel of the robot;
        determining the reference body size value in proportion to the calculated distance;
        determining a body size value of the user; and
        determining body information of the user based on a difference between the reference body size value and the body size value of the user.

3. The method according to claim 1, wherein the scanning includes:
    capturing, by the camera, a first image of the user in a first direction;
    capturing, by the camera, a plurality of second images of the user at different angles by moving the robot around the user; and
    determining body information of the user based on the first image and the second images, and
    wherein the determined body information includes at least one of the following: a height of the user, an arm length of the user, a leg length of the user, and a position of a joint of the user.

4. The method according to claim 1, wherein moving the robot to the first position includes:
    measuring a distance between the user and the robot;
    when the distance between the user and the robot is less than the predetermined reference distance, moving the robot, by the robot, to be spaced apart from the user by the predetermined reference distance;
    determining whether the predetermined range or more of the body of the user is scannable through the camera at the predetermined reference distance; and
    when the robot is located at the predetermined reference distance and less than the predetermined range of the body of the user is determined to be scannable by the camera, controlling the robot to move the robot to a second position, and
    wherein in the second position, the robot is spaced apart from the user more than the predetermined reference distance.

5. The method according to claim 3, wherein providing the fitting service includes displaying a user interface screen on the display, the user interface screen including an image of a clothing for selection by the user, and
    wherein the method further includes, in response to selection of the clothing by the user, displaying, on the user interface screen, a synthesized image obtained by synthesizing the virtual avatar character and the selected clothing.

6. The method according to claim 3, wherein the scanning further includes:
    displaying a user interface screen on the display; and
    displaying a graphical image indicating a scanning progress of the scanning.

7. The method according to claim 6, wherein the scanning further includes outputting a message on the user interface screen for guiding a user action.

8. The method according to claim 3, the method further including, in response to completing the scanning:
    displaying a message informing completion of the scanning; and
    displaying information about a recommended clothing size based on the body information of the user.

9. The method according to claim 1, the method further including:
    receiving, by a server, at least one of the following: new product information, information of a number of sales of a plurality of products, or event information; and
    recommending a predetermined product based on the received information by displaying the predetermined product on the display.

10. The method according to claim 1, the method further including:
    identifying, by the camera, the user;
    receiving, from a server, user information of at least one of the following: a previous purchase of the user and fitting information of the user; and
    displaying, on the display, a recommended predetermined product based on the user information.

11. The method according to claim 5, wherein providing the fitting service further includes:
    displaying, on the user interface screen, a recommended size of the selected clothing based on the body information of the user; and displaying, on the user interface screen, a product option item capable of changing an option of the selected clothing, the option including a size or a color of the selected clothing.

12. The method according to claim 1, wherein the display includes:
a first display for receiving a user input; and
a second display spaced apart from the first display, the second display displaying the virtual avatar character.

13. A robot, comprising:
a main body;
a camera for scanning a user and for generating a result of scanning;
an input assembly for receiving a request for fitting service from the user;
a first display for displaying a virtual avatar character of the user and for providing the fitting service, and
a processor configured to provide the fitting service by:
controlling the robot so that a predetermined distance exists between the robot at a first position and the user at a predetermined reference distance, wherein in the first position, a predetermined range or more of a body of the user is scannable by the camera of the robot,
controlling the camera to scan, at the first position, the predetermined range or more of the body of the user,
generating a virtual avatar character of the user based on the result of scanning, and
controlling the first display to display the virtual avatar character,
wherein the fitting service is provided to the virtual avatar character by determining body shape information of the user by comparing the result of the scanning with a reference body size for the predetermined reference distance from the user.

14. The robot according to claim 13, wherein the input assembly comprises a microphone configured to receive the request for fitting service from the user as a voice input.

15. The robot according to claim 13, wherein robot further includes a second display spaced apart from the first display,
wherein the second display is a touch display, and
wherein the second display is configured to receive a touch input by the user for requesting the fitting service.

16. The robot according to claim 13, wherein the robot includes a wheel for moving the main body, and
wherein the processor is further configured to:
calculate a distance that the robot moves by measuring a rotational speed of the wheel of the robot,
determine the reference body size value in proportion to the calculated distance,
determine a body size value of the user, and
determine body information of the user based on a difference between the reference body size value and the body size value of the user.

17. The robot according to claim 13, wherein the robot is configured to:
capture, by the camera, a first image of the user in a first direction, and
capture, by the camera, a plurality of second images of the user at different angles by moving the robot around the user, and
determine, by the processor, body information of the user based on the first image and the second images, and
wherein the determined body information includes at least one of the following: a height of the user, an arm length of the user, a leg length of the user, and a position of a joint of the user.

18. The robot according to claim 13, wherein the processor controls the robot to move the robot to a first position by:
measuring a distance between the user and the robot;
when the distance between the user and the robot is less than the predetermined reference distance, moving the robot, by the robot, to be spaced apart from the user by the predetermined reference distance;
determining whether the predetermined range or more of the body of the user is scannable through the camera at the predetermined reference distance; and
when the robot is located at the predetermined reference distance and less than the predetermined range of the body of the user is determined to be scannable by the camera, controlling the robot to move the robot to a second position, and
wherein in the second position, the robot is spaced apart from the user more than the predetermined reference distance.

19. The robot according to claim 13, wherein the processor is further configured to:
control the first display to display a user interface screen, the user interface screen including an image of a clothing for selection by the user, and
in response to selection of clothing by the user, displaying, on the user interface screen, a synthesized image obtained by synthesizing the virtual avatar character and the selected clothing by the user.

20. The robot according to claim 13, wherein the processor is further configured to:
identify the user by controlling the camera to capture an image of the user;
receive, from a server, user information of at least one of the following: a previous purchase of the user and fitting information of the user; and
control the first display to display a recommend predetermined product based on the user information.

* * * * *